(12) United States Patent
Heo et al.

(10) Patent No.: US 11,886,624 B2
(45) Date of Patent: Jan. 30, 2024

(54) CRYPTO DEVICE, INTEGRATED CIRCUIT AND COMPUTING DEVICE HAVING THE SAME, AND WRITING METHOD THEREOF

(71) Applicant: Samsung Electronics Co., Ltd., Suwon-si (KR)

(72) Inventors: Ingoo Heo, Yongin-si (KR); Youngwook Noh, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 193 days.

(21) Appl. No.: 17/473,137

(22) Filed: Sep. 13, 2021

(65) Prior Publication Data

US 2022/0207192 A1   Jun. 30, 2022

(30) Foreign Application Priority Data

Dec. 28, 2020   (KR) .................. 10-2020-0184616

(51) Int. Cl.
| | | |
|---|---|---|
| *G06F 21/79* | (2013.01) | |
| *G09C 1/00* | (2006.01) | |
| *H04L 9/06* | (2006.01) | |
| *G06F 21/72* | (2013.01) | |
| *G06F 21/60* | (2013.01) | |
| *H04L 9/08* | (2006.01) | |
| *G06F 13/40* | (2006.01) | |
| *G06F 13/16* | (2006.01) | |

(52) U.S. Cl.
CPC ............. *G06F 21/79* (2013.01); *G06F 13/40* (2013.01); *G06F 21/602* (2013.01); *G06F 21/72* (2013.01); *G09C 1/00* (2013.01); *H04L 9/065* (2013.01); *H04L 9/0631* (2013.01); *H04L 9/0637* (2013.01); *H04L 9/0869* (2013.01); *G06F 13/1668* (2013.01); *H04L 2209/122* (2013.01)

(58) Field of Classification Search
CPC ........ G06F 13/40; G06F 21/60; G06F 21/602; G06F 21/70; G06F 21/71; G06F 21/72; G06F 21/78; G06F 21/79; G06F 13/16; G06F 13/1668; G09C 1/00; H04L 9/06; H04L 9/0618; H04L 9/0631; H04L 9/0637; H04L 9/065; H04L 9/0861; H04L 9/0869; H04L 2209/122
See application file for complete search history.

(56) References Cited

U.S. PATENT DOCUMENTS

| | | |
|---|---|---|
| 8,880,898 B2 | 11/2014 | Smeets |
| 9,904,805 B2 | 2/2018 | Chhabra et al. |
| (Continued) | | |

FOREIGN PATENT DOCUMENTS

| | | |
|---|---|---|
| JP | 2012-151805 A | 8/2012 |
| JP | 2013-167740 A | 8/2013 |

*Primary Examiner* — D'Arcy Winston Straub
(74) *Attorney, Agent, or Firm* — Harness, Dickey & Pierce, P.L.C.

(57) ABSTRACT

A writing method of a crypto device includes receiving a write request from a central processing unit, determining a write attribute of the write request, and performing one of a partial write operation and a full write operation according to the write attribute. In the full write operation, a random number for a version count is generated, a key stream is generated using the version count, the key stream and write data are encrypted in a first logical operation, and the encrypted data and the version count are stored in a memory device.

20 Claims, 20 Drawing Sheets

(56) References Cited

U.S. PATENT DOCUMENTS

| | | |
|---|---|---|
| 10,108,557 B2 | 10/2018 | Durham et al. |
| 2012/0191984 A1 | 7/2012 | Ohyama |
| 2014/0223197 A1 | 8/2014 | Gueron et al. |
| 2016/0182223 A1* | 6/2016 | Kishinevsky ........... G06F 21/85 380/28 |
| 2016/0364343 A1* | 12/2016 | Case .................... G06F 12/145 |
| 2019/0050347 A1* | 2/2019 | Bolotov .............. G06F 12/1408 |
| 2019/0073319 A1 | 3/2019 | Yang et al. |
| 2019/0238312 A1 | 8/2019 | Dickens, III et al. |

* cited by examiner

CRYPTO DEVICE, INTEGRATED CIRCUIT AND COMPUTING DEVICE HAVING THE SAME, AND WRITING METHOD THEREOF

CROSS-REFERENCE TO RELATED APPLICATION(S)

This application claims the benefit under 35 USC 119(a) of Korean Patent Application No. 10-2020-0184616 filed on Dec. 28, 2020 in the Korean Intellectual Property Office, the entire disclosure of which is incorporated herein by reference for all purposes.

BACKGROUND

The present inventive concepts relate to crypto devices, integrated circuits and computing devices having the same, and writing methods thereof.

In general, a system on chip (SoC) may represent a chip in which various systems are integrated. Since the SoC integrates various systems, the capacity of the SoC's internal memory (e.g., static random access memory (SRAM)) may be limited. Due to the limited capacity of the internal memory, the SoC may communicate with external memory devices. When the SoC and the external memory device communicate through physical lines and pins that may be exposed externally, there is a risk that an attacker may probe data transmitted between the SoC and the external memory device.

In the case of the related art, version count metadata is read from a memory at each write time, and then, is increased by 1, and a key stream is generated, to perform XOR with the write data, and then, the data is stored. For this operation, reading metadata should always precede when writing, and the incremented version count metadata should be stored in memory. Therefore, when a write operation is performed, a read operation is always required, thereby increasing the number of memory accesses.

In addition, the related art assumes only the memory area used by the CPU to protect the memory data. Therefore, only read and write in the cache line ("CL") unit is always assumed, and thus, data protection is not considered for bus masters such as DMA or devices that may write operations of smaller sizes than CL. In the case of managing read/write in the unit of CL in conjunction with the version counter, even if only part of the data in the CL size is selectively written, all of the CL size data should be updated. Accordingly, it would be beneficial to consider techniques for partial write requires Read-Modify-Write ("RMW").

SUMMARY

Example embodiments provide crypto devices supporting a partial write operation, integrated circuits and computing devices having the same, and writing methods thereof.

Example embodiments provide a crypto device improving performance while supporting a partial write operation, an integrated circuit and a computing device having the same, and a writing method thereof.

According to example embodiments, a writing method of a crypto device includes receiving a write request from a central processing unit, determining a write attribute of the write request, and performing one of a partial write operation and a full write operation according to the write attribute. The full write operation includes generating a random number for a version count, generating a key stream using the version count, encrypting write data by performing a first logical operation on the key stream and the write data, and storing the encrypted data and the version count in a memory device.

According to example embodiments, an integrated circuit includes a central processing unit configured to control an overall operation of the integrated circuit, a crypto device circuit configured to receive a write request from the central processing unit and encrypt write data, or receive a read request from the central processing unit and decrypt read data received from a memory device, and a memory controller configured to write the encrypted data to the memory device or read the read data from the memory device according to a request from the crypto device. The crypto device circuit being configured to receive the write request from the central processing unit, determine a write attribute of the write request, and perform one of a partial write operation and a full write operation according to the write attribute, wherein the full write operation includes generating a random number for a version count, generating a key stream using the version count, encrypting write data by performing a logical operation on the key stream and the write data, and storing the encrypted data and the version count in a memory device.

According to example embodiments, a computing device includes a system-on-chip (SoC), and at least one memory device having a first area and a second area. The SoC includes at least one central processing unit, a crypto device circuit configured to encrypt write data in response to a write request from the at least one central processing unit, and generate a version count corresponding to the write request, and a memory controller configured to control the at least one memory device to store the version count in the first area and store the encrypted data in the second area. The version count being generated by a random number during a full write operation.

According to example embodiments, a crypto device includes a write attribute analyzer circuit configured to receive a write request from a central processing unit, output a first address and a first control signal for write data, and output a read-modify-write (RMW) activation signal by analyzing a writing operation attribute of the write request, an address generator circuit configured to receive the first address and the first control signal, and output a second address and a second control signal for version count, an address-data scheduler circuit configured to receive the first address and the first control signal from the write attribute analyzer circuit, receive the second address and the second control signal from the address generator circuit, and output a read request or a write request corresponding to a partial write operation or a full write operation according to the RMW activation signal, to a memory controller, a random number generator circuit configured to generate a random number for a new version count when the RMW activation signal indicates an inactive state, an encryption module configured to receive the write data from the write attribute analyzer circuit, generate a key stream corresponding to the version count, encrypt the key stream and the write data by a first logical operation, and output the encrypted data and the version count to the address-data scheduler circuit, a decryption module configured to receive encrypted read data and a previous version count from the address-data scheduler circuit, generate a previous key stream corresponding to the previous version count, and decrypt the encrypted read data by performing a second logical operation on the previous key stream and the encrypted read data, and a main controller configured to control the write attribute analyzer circuit, the address generator circuit, the address-data scheduler circuit, and the random number generator circuit.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, example embodiments will be described with reference to the accompanying drawings.

Figure 1:
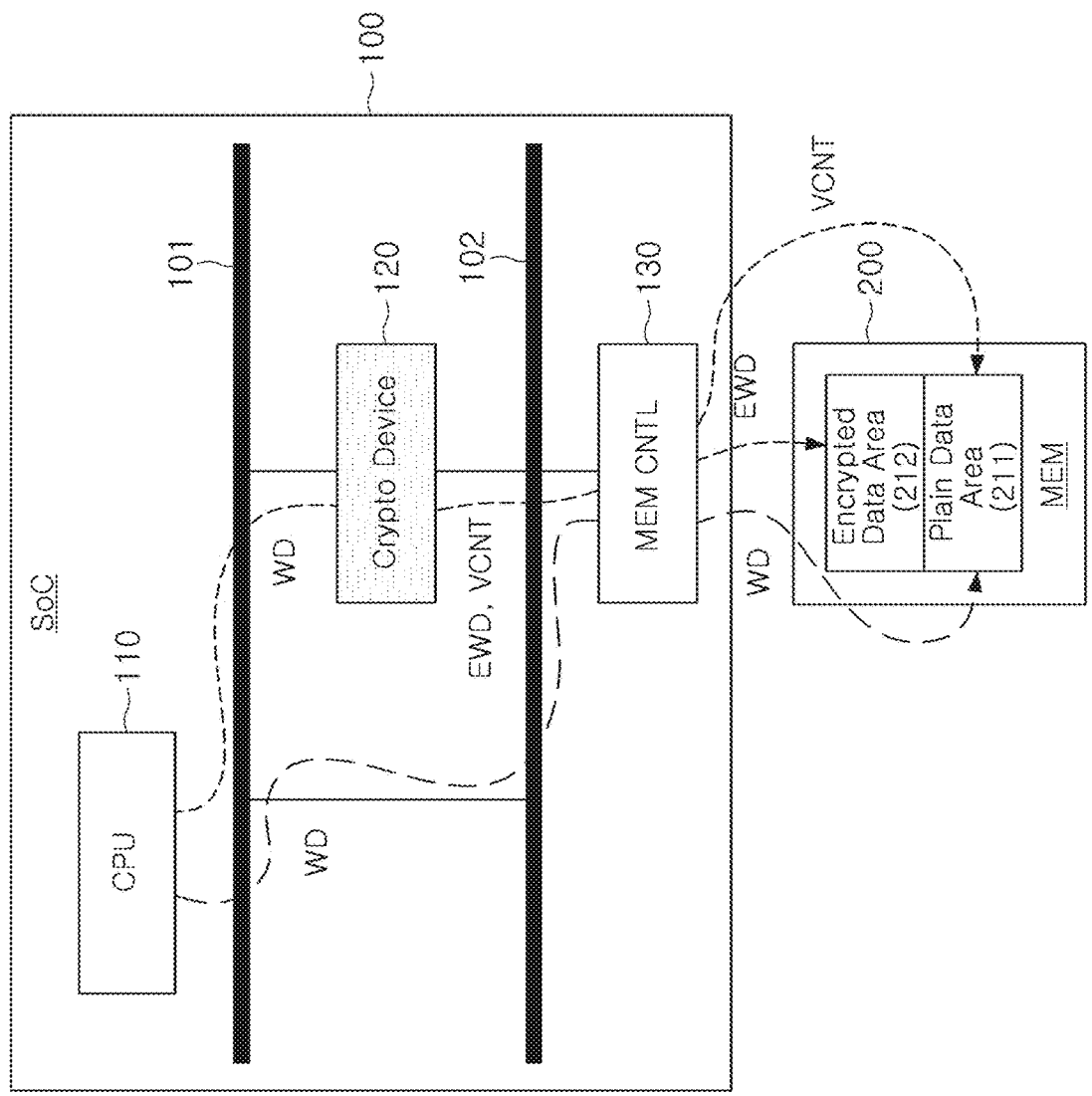
FIG. 1 is a diagram illustrating a computing device 10 according to some example embodiments.

FIG. 1 is a diagram illustrating a computing device 10 according to some example embodiments. Referring to FIG. 1, the computing device 10 may include an integrated circuit 100 (which may also be referred to as a system on a chip or "SoC") and a memory device 200.

The integrated circuit 100 (SoC) may be implemented to control overall operations of the computing device 10. The integrated circuit 100 may include at least one central processing unit 110 (CPU), at least one crypto device 120, and at least one memory controller 130 (MEM CNTL).

The central processing unit 110 may be implemented to control the operation of the integrated circuit 100 by driving an operating system. The CPU 110 may be implemented to perform arithmetic logic operations or data processing according to at least one instruction. Although not illustrated, the CPU 110 may include a program counter, an arithmetic logic unit (ALU), a register, and the like.

The crypto device 120 may be implemented to encrypt the data transmitted from the CPU 100 through a bus 101 using an encryption algorithm, or to decrypt the encrypted data transmitted from the memory controller 130 through a bus 102, using an encryption algorithm. In some example embodiments, the encryption algorithm may include one or more of Advanced Encryption Standard (AES), Data Encryption Standard (DES), TripleDES, SEED, High security and light weight (HIGHT), ARIA, Lightweight Encryption Algorithm (LEA), and/or the like. In some example embodiments, the encryption algorithm may perform an encryption/decryption operation in a block encryption mode. For example, the block encryption mode may be a counter (CTR) mode. It should be understood that the block cipher mode according to some example embodiments is not limited thereto.

In addition, the crypto device 120 may generate a version count VCNT in response to a write request from the central processing unit 110, generate a stream key using the generated version count VCNT, and encrypt data WD using the stream key. In addition, the crypto device 120 may output the encrypted data EWD and the version count VCNT to the memory controller 130. Also, the crypto device 120 may output a first address corresponding to the encrypted data EWD and a second address corresponding to the version count VCNT to the memory controller 130. For example, the first address may indicate an encrypted data area 212 (or 'second memory area') of the memory device 200, and the second address may indicate a plain data area 211 (or 'first memory area') of the memory device 200.

In addition, the crypto device 120 may generate the version count VCNT in different manners according to file properties. For example, when a file property indicates a partial write operation (for example, a read-modify-write (RMW) operation), the version count VCNT first reads a previous version count from the memory device 200, and then may be incremented by the counter. In some example embodiments, when the file attribute indicates a full write operation, the version count VCNT may be generated by a random number.

In addition, the crypto device 120 may receive the version count VCNT and the encrypted data EWD in response to a read request from the central processing unit 110, generate a stream key in response to the version count, and decrypt the encrypted data EWD using the stream key.

The memory controller 130 may be implemented to control the memory device 200. The memory controller 130 may receive a write request from the central processing unit 110 and may write the data WD to the plain data area 211 of the memory device 200. The memory controller 130 receives a read request from the central processing unit 110 and accesses to the plain data area 211 of the memory device 200, thereby reading data.

In addition, the memory controller 130 may receive a write request for the encrypted data EWD from the crypto device 120 and may write the encrypted data EWD to the encrypted data area 212 of the memory device 200. Also, the memory controller 130 may receive a write request for the version count VCNT from the crypto device 120 and may write the version count VCNT to the plain data area 211 of the memory device 200.

Also, the memory controller 130 may receive a read request from the crypto device 120 and read the encrypted data EWD from the encrypted data area 212 of the memory device 200. Also, the memory controller 130 may receive a read request for the version count VCNT from the crypto device 120 and read the version count VCNT from the plain data area 211 of the memory device 200.

The memory device 200 may be implemented to store data. For example, the data may include encrypted data EWD and plain data.

The memory device 200 may include the plain data area 211 and the encrypted data area 212. In some example embodiments, the memory device 200 may be implemented as a dynamic random access memory (DRAM), synchronous DRAM (SDRAM), double data rate synchronous dynamic random access memory (DDR SDRAM), low power double data rate (LPDDR) SDRAM, Rambus DRAM (RDRAM), dual in-line memory module (DIMM), nonvolatile DIMM (NVDIMM), phase change random access memory (PRAM), and/or the like.

In general computing devices, after reading metadata having a version count from a memory device for each write operation, a key stream is generated by incrementing the version count by 1, and a key stream and write data are logically operated, thereby performing encryption to be stored in the memory device. For such a write operation, a general computing device should always first read the metadata of the memory device during a writing operation, and should store the increased version count in the memory device. This increases the number of memory accesses by always requesting a read operation while performing a write operation.

Meanwhile, the computing device 10 according to some example embodiments of the present inventive concepts may allow a partial write operation of the related art, and simultaneously, may generate a version count using a random number during a full write operation, thereby eliminating or reducing unnecessary access of the memory device 200. Accordingly, the computing device 10 according to some example embodiments of the present inventive concepts may be expected to improve system performance and efficiency.

Figure 2:
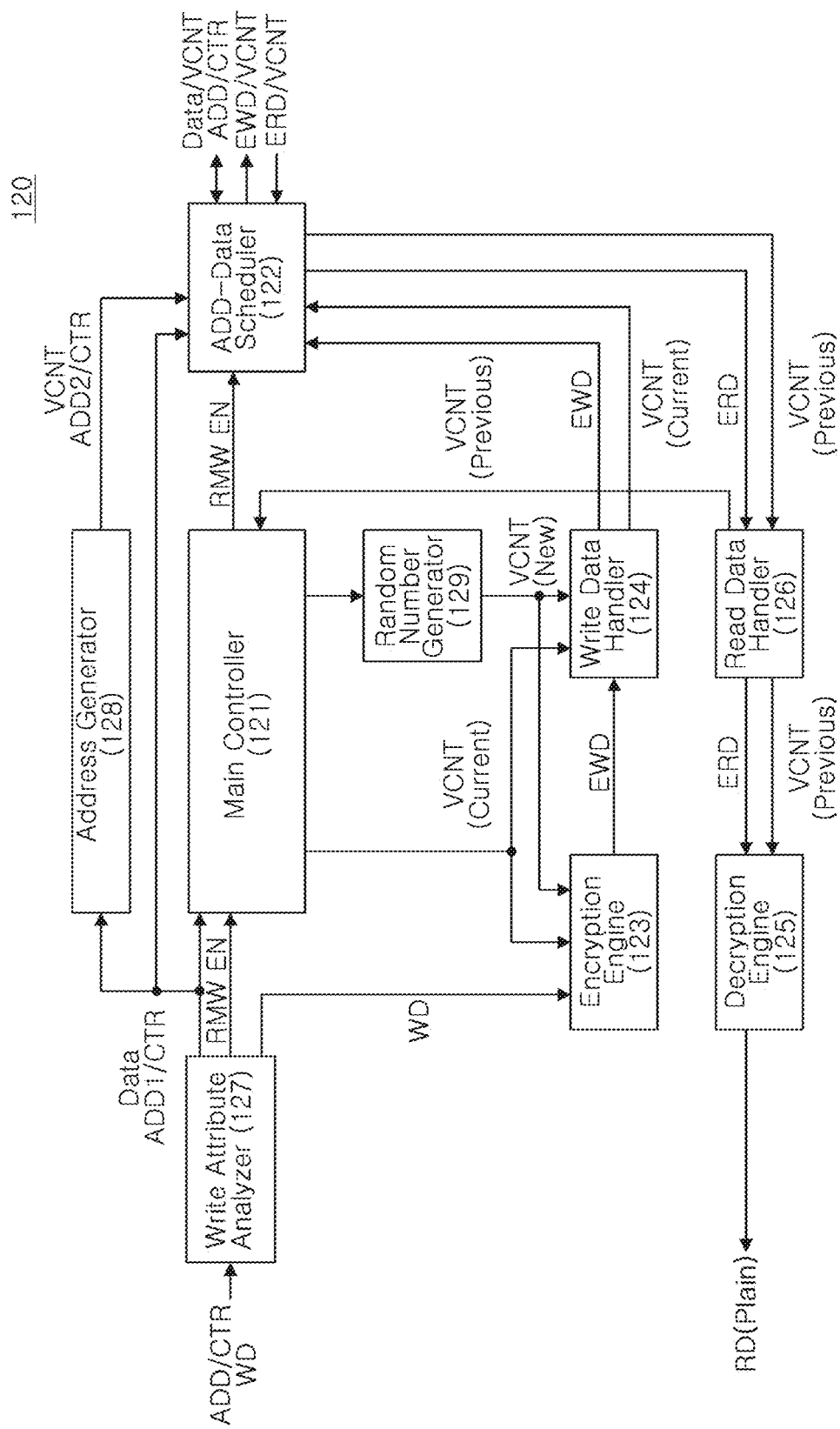
FIG. 2 is a diagram illustrating a crypto device 120 according to some example embodiments.

FIG. 2 is a diagram illustrating the crypto device 120 according to some example embodiments. Referring to FIG. 2, the crypto device 120 may include a main controller 121, an address-data scheduler 122, an encryption engine 123, a write data handler 124, a decryption engine 125, a read data handler 126, a write attribute analyzer 127, an address generator 128, and/or a random number generator 129.

Each of the CPU 110, crypto device 120, and memory controller 130, and components, for example, the main controller 121, address-data scheduler 122, encryption engine 123, write data handler 124, decryption engine 125, read data handler 126, write attribute analyzer 127, address generator 128, and random number generator 129, may be embodied by processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microprocessor, a microcomputer, a field programmable gate array (FPGA), a programmable logic unit, a microprocessor, an application-specific integrated circuit (ASIC), etc. The crypto device 120 and components, for example, the main controller 121, address-data scheduler 122, encryption engine 123, write data handler 124, decryption engine 125, read data handler 126, write attribute analyzer 127, address generator 128, and random number generator 129 may also be referred to, in the present specification, as crypto device circuit 120, address-data scheduler circuit 122, encryption engine circuit 123, write data handler circuit 124, decryption engine circuit 125, read data handler circuit 126, write attribute analyzer circuit 127, address generator circuit 128, and random number generator circuit 129.

The main controller 121 may be implemented to control overall operations of the crypto device 120. The main controller 121 may receive a first control signal CTR1 and a first address ADD1 for write data WD. In addition, the main controller 121 may receive a Read-Modify-Write activation signal RMW EN from the write attribute analyzer 127, and may output the RMW activation signal RMW EN to the address-data scheduler 122.

In addition, the main controller 121 reads a previous version count VCNT (previous) from the memory device 200 (see FIG. 1) in response to the RMW activation signal RMW EN, and counts up the previous version count, thereby generating the current version count VCNT (current). For example, the current version count VCNT (current)may be provided to the encryption engine 123 and the write data handler 124. Also, the main controller 121 may receive the previous version count VCNT (previous)from the read data handler 126.

The address-data scheduler 122 may be implemented to schedule bus transactions related to memory operations (writing/reading operations). The address-data scheduler 122 may be scheduled to write a plurality of encrypted data and metadata (e.g., version count) corresponding thereto, to the memory device 200, or to read encrypted data and metadata (e.g., version count) from the memory device 200.

The address-data scheduler 122 may receive and a first control signal CTR1 and a first address ADD1 for write data from the write attribute analyzer 127 in a writing operation, and a second control signal CTR2 and a second address ADD2 for a version count VCNT from the address generator 128.

In some example embodiments, the address-data scheduler 122 may perform scheduling for a write operation by receiving the RMW activation signal RMW EN from the main controller 121. Thereafter, the address-data scheduler 122 may output read requests to the memory controller 130, to read previously encrypted data in response to the RMW activation signal RMW EN in the area 212 (refer to FIG. 1) of the memory device 200 corresponding to the first address ADD1, and to read the previous version count VCNT (previous) in the area 211 (refer to FIG. 1) of the memory device 200 corresponding to the second address ADD2 in response to the RMW activation signal RMW EN. Thereafter, the address-data scheduler 122 may receive the encrypted data EWD and the current version count VCNT (current) from the write data handler 124. Thereafter, the address-data scheduler 122 may output the write requests to the memory controller 130, to write the encrypted data EWD in the area 212 of the memory device 200 corresponding to the first address ADD1, and to write the current version count VCNT (current) to the area 211 of the memory device 200 corresponding to the second address ADD2.

In some example embodiments, the address-data scheduler 122 may perform scheduling for a write operation without receiving the RMW activation signal RMW EN from the main controller 121. For example, the address-data scheduler 122 may perform scheduling to perform a write operation immediately without accessing the memory device 200 to obtain the previous data and the previous version count. For example, the address-data scheduler 122 may receive encrypted data EWD and a current version count VCNT (current) from the write data handler 124. For example, the current version count VCNT (current) is a value generated by the random number generator 129. Thereafter, the address-data scheduler 122 may output write requests to the memory controller 130, to write the encrypted data EWD in the area 212 of the memory device 200 corresponding to the first address ADD1, and to write the current version count VCNT (current) in the area 211 of the memory device 200 corresponding to the second address ADD2.

In summary, the address-data scheduler 122 may output write requests to the memory controller 130, to write the encrypted data EWD in the area 212 of the memory device 200 corresponding to the first address ADD1, and to write the current version count VCNT (current) in the area 211 of the memory device 200 corresponding to the second address ADD2.

In addition, the address-data scheduler 122 may output the encrypted data EWD/version count VCNT corresponding to the address and control signal for the data/version count, to the memory controller 130, during a write operation. In addition, the address-data scheduler 122 may receive encrypted read data ERD/version count VCNT corresponding to an address and a control signal for data/version count, from the memory controller 130, during a read operation.

The encryption engine 123 may be implemented to generate a key stream corresponding to the version count VCNT based on an encryption algorithm, and to generate the encrypted data EWD by logically calculating the key stream and the write data WD. For example, the encryption algorithm may be an AES algorithm, and the logical operation may be an XOR operation.

The write data handler 124 may be implemented to transmit the encrypted data EWD and the current version count VCNT (current) to the address-data scheduler 122 during a write operation. For example, the current version count VCNT (current) may be one of a value counted up from a previous version count and a value generated by the random number generator 129 according to the property of the write operation. In some example embodiments, the encryption engine 123 and the write data handler 124 may be collectively referred to as an encryption module.

The decryption engine 125 may be implemented to generate a key stream corresponding to the previous version count VCNT (previous) based on an encryption algorithm, and to decrypt the encrypted read data ERD by logically calculating the key stream and the encrypted read data ERD. For example, the encryption algorithm may be an AES algorithm, and the logical operation may be an XOR operation.

The read data handler 126 may be implemented to receive encrypted read data ERD and previous version count VCNT from the address-data scheduler 122 during a read operation. In some example embodiments, the read data handler 126 may transmit a previous version count VCNT (previous) to the main controller 121 during a partial write operation. In some example embodiments, the decryption engine 125 and the read data handler 126 may be collectively referred to as a decryption module.

The write attribute analyzer 127 may be implemented to receive a write request, output a first address ADD1 and a first control signal for data, and analyze a write attribute. For example, the write request may include write data WD, an address ADD, and a control signal CTR. For example, the address ADD may be an address corresponding to the encrypted data area 212 of the memory device 200. For example, the control signal CTR may include a write strobe signal WSTRB.

The write strobe signal WSRTB may be used to indicate a byte of effective write data each time data is transmitted. For example, when performing a write transaction on a 32-bit data bus, a 4-bit write strobe signal WSTRB may be generated. For example, whether each of the four bytes is valid may be determined according to '1' or '0' of the write strobe signal WSTRB. For example, the write attribute analyzer 127 may determine whether it is a partial write operation or a full write operation by analyzing the write strobe signal WSTRB transmitted together with the write data WD.

In addition, the write attribute analyzer 127 may generate an RMW activation signal RMW EN according to a write attribute. For example, when the write strobe signal WSTRB indicates a partial write operation, the read-modify-write activation signal RMW EN may indicate an activation state.

The address generator 128 may be implemented to receive a first address ADD1 and a first control signal CTR1 for write data WD and to generate a second address ADD2 and a second control signal CTR2 for version count VCNT. For example, the second address ADD2 may be a memory area allocated to the crypto device 120.

The random number generator 129 may be implemented to generate a random number to generate a version count VCNT under the control of the main controller 121. In some example embodiments, the random number may be generated using, for example, thermal noise, shot noise, or metastability of a ring oscillator.

The crypto device 120 according to some example embodiments may determine the necessity of performing the RMW operation and the read operation for the version count according to the attribute of the write operation required from the bus, and may perform the RMW operation and read operation according to the determination result. For example, the crypto device 120 may determine whether to perform the RMW operation by determining the attribute of the write operation. In addition, in the case of a full write operation in which the RMW operation is deactivated, the crypto device 120 may perform data encryption only by a write operation without a read operation for the version count through random number generation.

Figure 3:
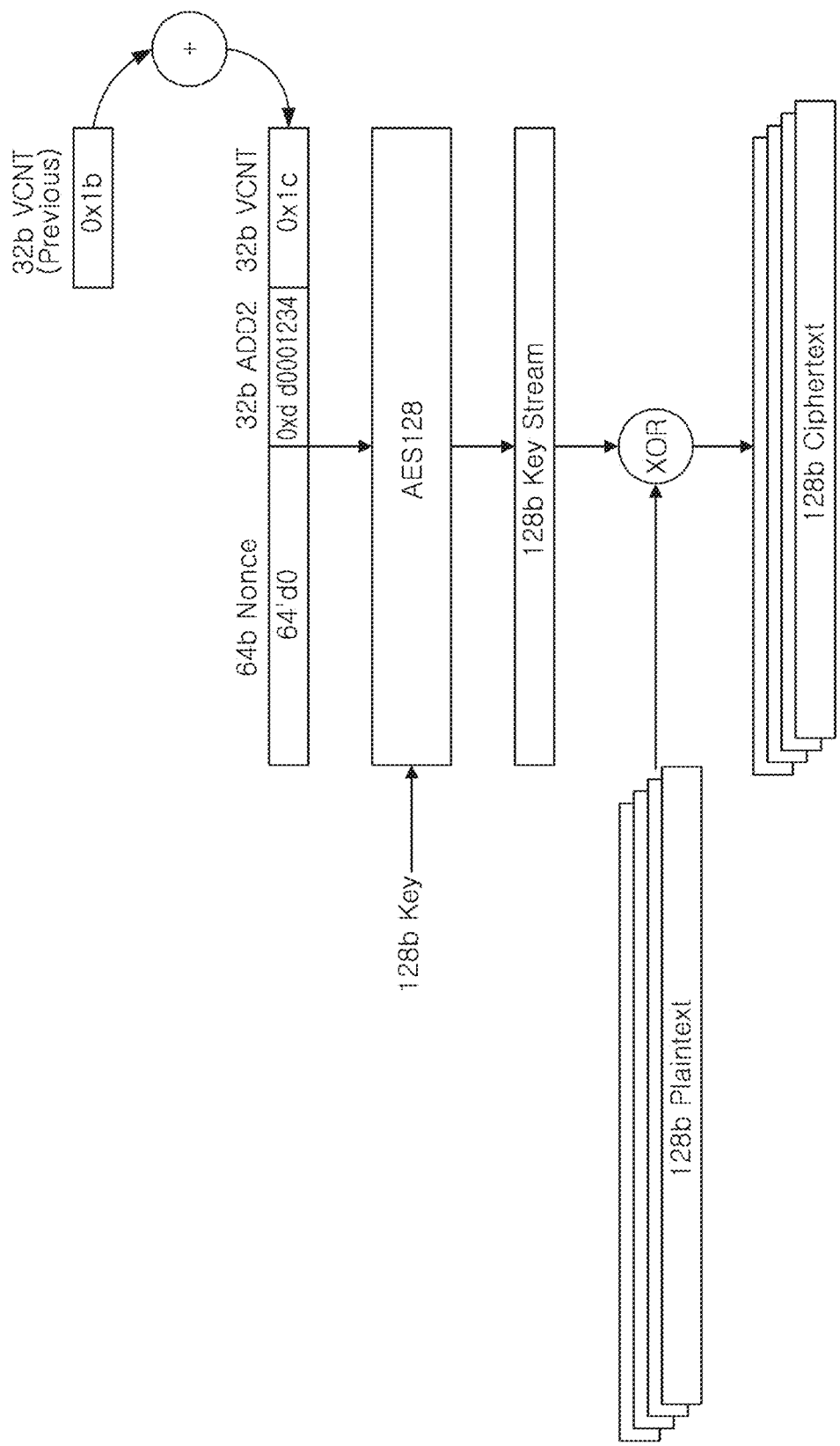
FIG. 3 is a diagram illustrating a process of encrypting data of the crypto device 120 according to some example embodiments.

FIG. 3 is a diagram illustrating a process of encrypting data of a crypto device 120 according to some example embodiments.

The crypto device 120 may generate a key stream for data using a nonce, an address, and a version count VCNT. In some example embodiments, the size of the nonce may be 64 bits. In some example embodiments, the size of the address may be 32 bits. In some example embodiments, the version count VCNT may be 32 bits. In some example embodiments, the version count VCNT may be generated by being counted up to the previous version count or may be generated by a random number. In some example embodiments, the size of the key stream may be 128 bits. In some example embodiments, the key stream may be generated based on a key value and an AES algorithm. For example, the size of the key value may be 128 bits.

As illustrated in FIG. 3, by performing an XOR operation on a plurality of plain texts with a key stream, a plurality of ciphertexts (e.g., encrypted data) may be generated. In some example embodiments, the size of each of the plurality of plain texts may be 128 bits. In some example embodiments, the size of each of the ciphertexts may be 128 bits.

It should be understood that the sizes of nonce, address, version count VCNT, key stream, key value, plain text, and ciphertext illustrated in FIG. 3 are only examples.

Figure 4:
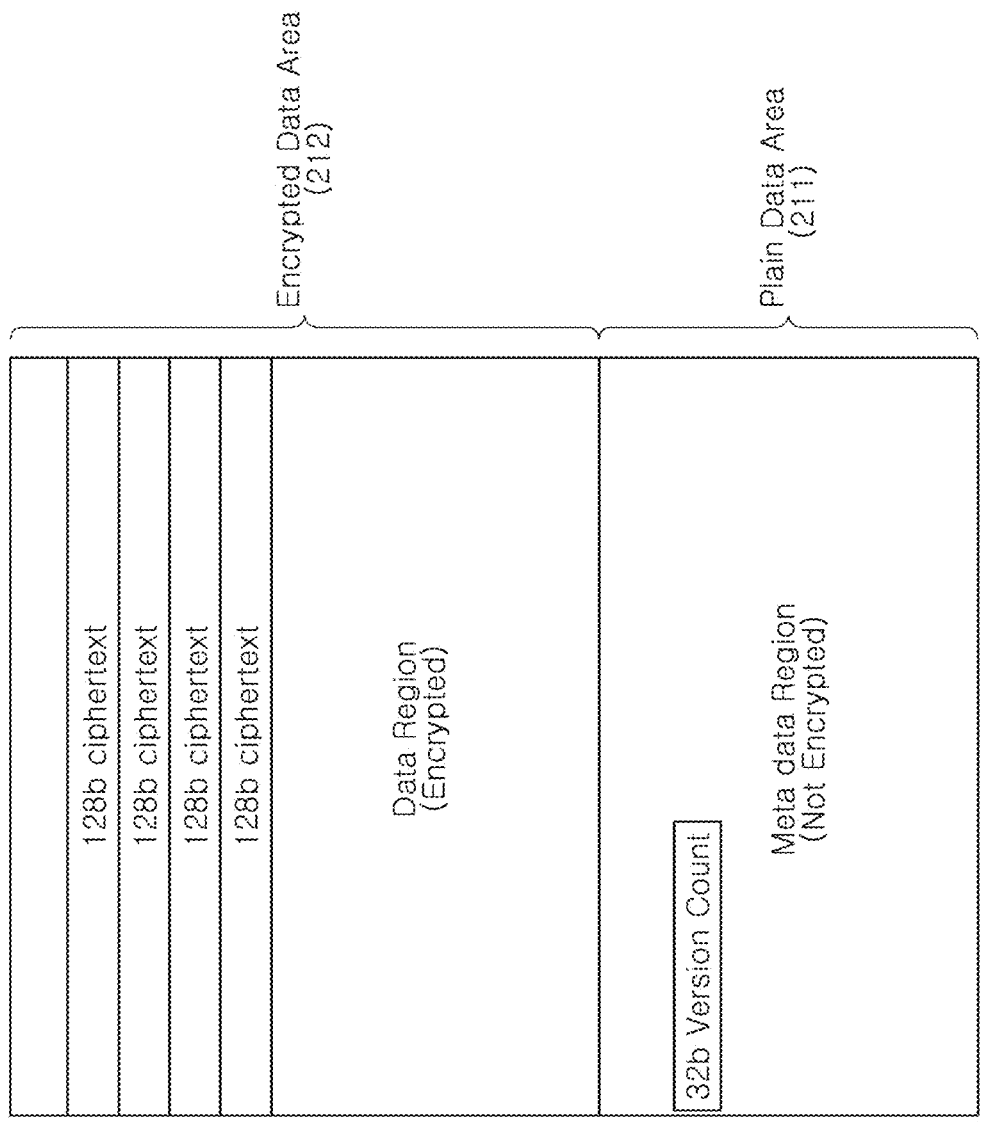
FIG. 4 is a diagram illustrating data storage in a memory device 200 according to some example embodiments.

FIG. 4 is a diagram illustrating data storage in the memory device 200 according to some example embodiments. Referring to FIG. 4, encrypted data may be stored in the encrypted data area 212 for each cache line. For example, a 128-bit ciphertext may be stored in the encrypted data area 212. The version count VCNT may be stored in the plain data area 211. For example, the 27-bit version count may be stored in the plain data area 211.

Figure 5:
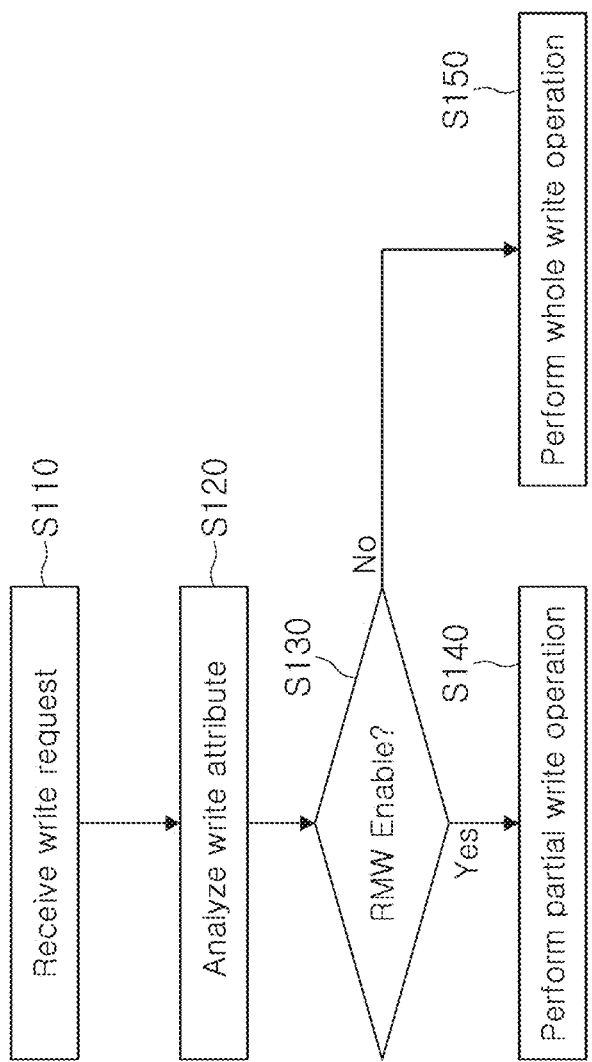
FIG. 5 is a flowchart illustrating a write operation of an integrated circuit 100 according to some example embodiments.

FIG. 5 is a flowchart illustrating a write operation of the integrated circuit 100 according to some example embodiments. Referring to FIGS. 1 to 5, a write operation of the integrated circuit 100 may be performed as follows.

The central processing unit 110 (refer to FIG. 1) may transmit a write request to the encryption device 120. For example, the write request may include write data and an address. The crypto device 120 may receive a write request from the central processing unit 110 (S110). The crypto device 120 may analyze the write attribute of the write request (S120). As a result of this write attribute analysis, the crypto device 120 may determine whether the RMW operation is activated (S130). When the RMW operation is activated, the integrated circuit 100 may perform a partial write operation (S140). In some example embodiments, when the RMW operation is deactivated, the integrated circuit 100 may perform a full write operation (S150).

In some example embodiments, the write request may include write data, a first address, and at least one control signal, and the at least one control signal may include a write strobe signal WSTRB indicating a byte of valid write data. In some example embodiments, the write attribute may be determined by analyzing the write strobe signal WSTRB.

In some example embodiments, a second address for storing the version count VCNT in the memory device 200 may be generated. In some example embodiments, the encrypted data EWD may be stored in the encrypted data area 212 of the memory device 200, and the version count VCNT may be stored in the plain data area 211 of the memory device 200.

In some example embodiments, in the partial write operation, a previous version count and previous data are read from the memory device 200, a previous key stream is generated using the previous version count, and a logical operation (for example, XOR operation) on the previous key stream and the previous data is performed to decrypt. In addition, a new version count is generated by counting up the previous version count, a new key stream is generated using the new version count, the decrypted data is modulated using write data, and the modulated data are encrypted by performing a logical operation on the new key stream and the modulated data. The encrypted data and the new version count may be stored in the memory device 200.

In some example embodiments, during a partial write operation, a read request for metadata having a version count and data may be transmitted to the memory device 200. Thereafter, a plurality of consecutive data and metadata corresponding to a read request may be received from the memory device 200. In some example embodiments, the address-data scheduler 122 may request merge transmission of metadata for efficient use of the bus.

Figure 6:
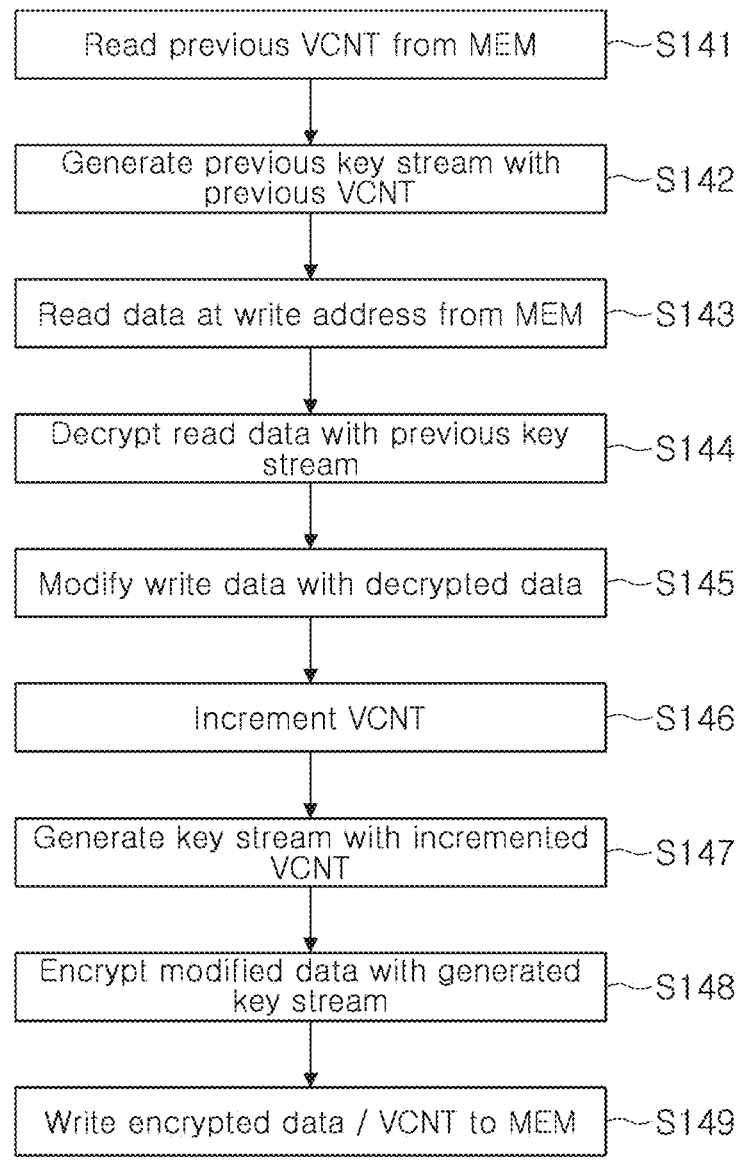
FIG. 6 is a flowchart illustrating a partial write operation S140 according to some example embodiments.

FIG. 6 is a flowchart illustrating the partial write operation S140 according to some example embodiments. Referring to FIGS. 1 to 6, the partial write operation may be performed as follows. In the case of a partial write operation according to the write attribute, the crypto device 120 may read the previous version count VCNT (previous) from the memory device 200 for the partial write operation (S141). The crypto device 120 may generate a previous stream key using the previous version count VCNT (previous) (S142). The crypto device 120 may read data corresponding to the write address from the memory device 200 (S143). The crypto device 120 may decrypt the read data using the previous stream key (S144). The crypto device 120 may modulate the decrypted data into write data (S145). Thereafter, the version count VCNT may be incremented (S146). For example, it may be counted up from the previous version count VCNT (previous). Thereafter, the crypto device 120 may generate a stream key using the incremented version count VCNT (S147). The crypto device 120 may encrypt the modulated data using the generated stream key (S148). Thereafter, the crypto device 120 may request the memory controller 130 to store the encrypted data and the generated version count VCNT in the memory device 200 (S149).

Figure 7:
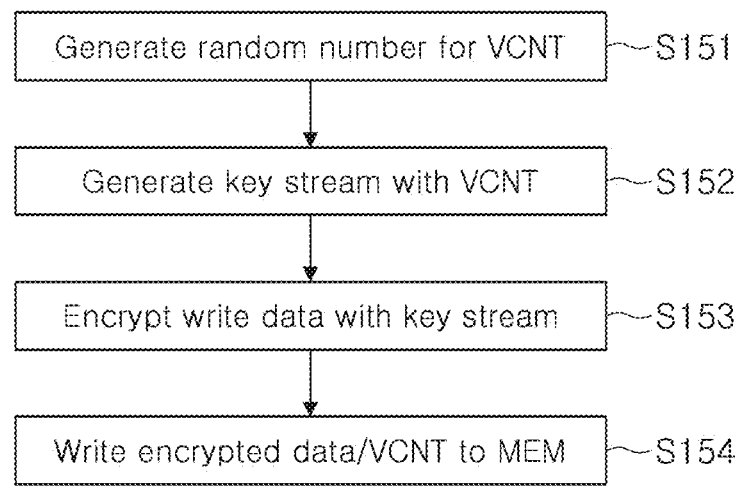
FIG. 7 is a flowchart illustrating a write operation S150 according to some example embodiments as an example.

FIG. 7 is a flowchart illustrating an example of the write operation (S150) according to some example embodiments. Referring to FIGS. 1 to 7, the full write operation may be performed as follows.

In the case of the full write operation according to the write attribute, the crypto device 120 may generate a random number for generating a version count (S151). The crypto device 120 may generate a key stream using the version count VCNT corresponding to the random number (S152). The crypto device 120 may encrypt the write data WD using the generated key stream (S153). The crypto device 120 may request the memory controller 130 to store the encrypted data and version count VCNT in the memory device 200 (S154).

Figure 8A:
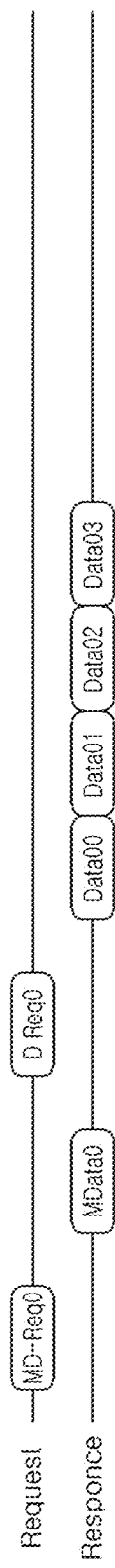
FIGS. 8A and 8B are drawings illustrating methods of requesting transmission of data and metadata of the crypto device 120 according to some example embodiments.
Figure 8B:
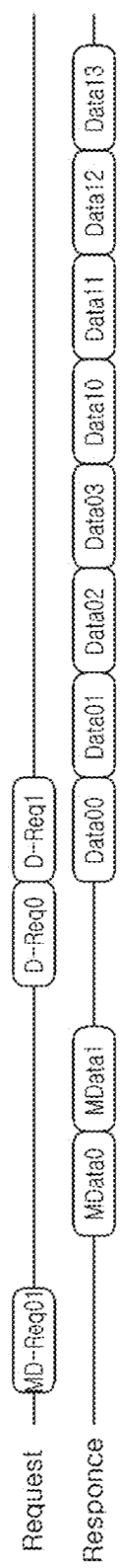

FIGS. 8A and 8B are views illustrating examples of methods of requesting transmission of data and metadata in the crypto device 120 according to some example embodiments.

Referring to FIG. 8A, the address-data scheduler 122 of the crypto device 120 may perform a first read request for one meta-data corresponding to one continuous data. In response to the first read request, the memory device 200 may output one metadata and corresponding continuous data.

Referring to FIG. 8B, the address-data scheduler 122 of the crypto device 120 may perform a second read request for a plurality of meta-data corresponding to a plurality of consecutive data. In response to the second read request, the memory device 200 may output a plurality of metadata and corresponding continuous data. Accordingly, the address-data scheduler 122 may transmit a merge transfer request for meta-data to the memory controller 120, to efficiently use the bus.

Figure 9:
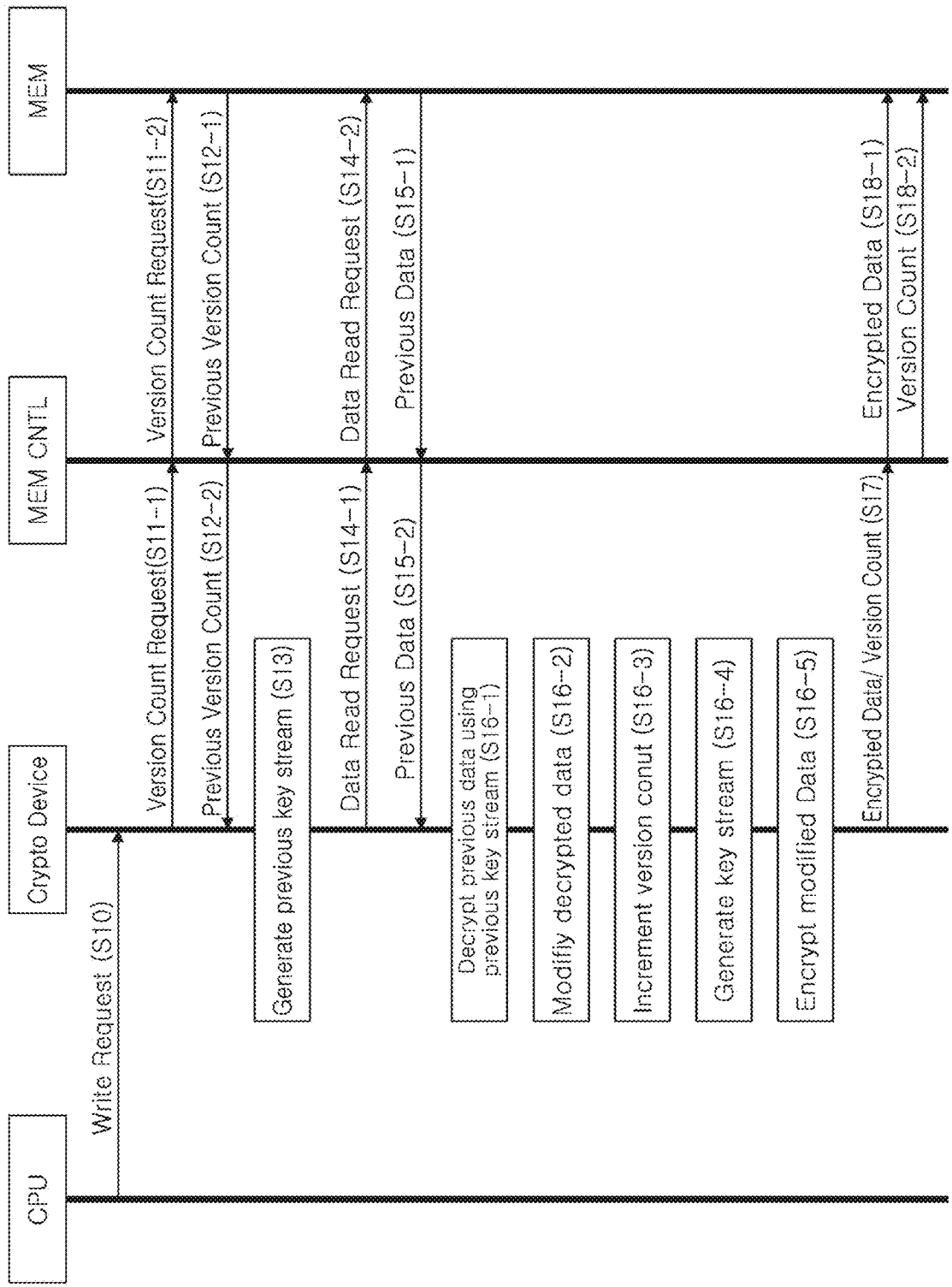
FIG. 9 is a diagram illustrating a ladder diagram of a write operation of the computing system 10 according to some example embodiments.

FIG. 9 is a diagram illustrating a ladder diagram of a write operation of a computing system 10 according to some example embodiments. Referring to FIGS. 1 to 9, the write operation of the computing system may proceed as follows.

The central processing unit CPU may transmit a write request for a partial write operation to the crypto device 120 (S10). Whether or not the partial write operation is performed may be known by checking the write strobe signal WSTB transmitted together with the write data WD.

When the write request is a request for a partial write operation (e.g., a remote memory region (RMR) operation), the crypto device 120 may request a previous version count VCNT (previous) from the memory controller MEM CNTL (S11-1). The memory controller MEM CNTL may request a previous version count VCNT (previous) from the memory device MEM using the address ADD2 (S11-2). For example, the address ADD2 may be received from the address-data scheduler 122 of the crypto device 120.

The memory device MEM may read the previous version count VCNT (previous) by accessing the memory area 211 corresponding to the address ADD2, and may output the read previous version count VCNT (previous) to the memory controller MEM CNTL (S12-1). The memory controller MEM CNTL may transmit the previous version count VCNT (previous) to the crypto device 120 (S12-2).

The crypto device 120 may receive the previous version count VCNT (previous) and generate a key stream using an encryption algorithm (S13). Thereafter, the crypto device 120 transmits a read request for the previously encrypted data ERD to the memory controller MEM CNTL (S14-1), and the memory controller MEM CNTL may transmit a read request for previously encrypted data ERD accessing the memory area 212 corresponding to the address ADD1, to the memory device MEM (S14-2). The memory device MEM may read the previously encrypted data ERD by accessing the memory area 212 corresponding to the address ADD1 and may output the read previously-encrypted data ERD to the memory controller MEM CNTL (S15-1). The memory controller MEM CNTL may transmit the previously encrypted data ERD to the crypto device 120 (S15-2).

The crypto device 120 may decrypt previously encrypted data ERD using the previous stream key (S16-1). The crypto device 120 may partially modulate the decrypted data RD using the write data WD (S16-2). Thereafter, the crypto device 120 may generate a current version count VCNT (current) by counting up a previous version count VCNT (previous) (S16-3). The crypto device 120 may generate a key stream using the current version count VCNT (current) (S16-4). Thereafter, the crypto device 120 may encrypt the modulated data by performing a logical operation (e.g., XOR operation) on the modulated data and the key stream (S16-5).

The crypto device 120 may transmit encrypted data EWD and the current version count VCNT (current) to the memory controller MEM CNTL (S17). The memory controller MEM CNTL may transmit a first write request to the memory device MEM to write the encrypted data EWD in the memory area 212 corresponding to the first address ADD1 (S18-1). Also, the memory controller MEM CNTL may transmit a second write request to the memory device MEM to write meta-data having a version count in the memory area 211 corresponding to the second address ADD2 (S18-2). In some example embodiments, although it is illustrated that the second write request is transmitted after transmitting the first write request, it will be understood that the present inventive concepts are not limited thereto.

The memory device MEM may receive the first and second write requests and store encrypted data EWD and a corresponding current version count VCNT (current) in each of the corresponding regions 212 and 211.

Figure 10:
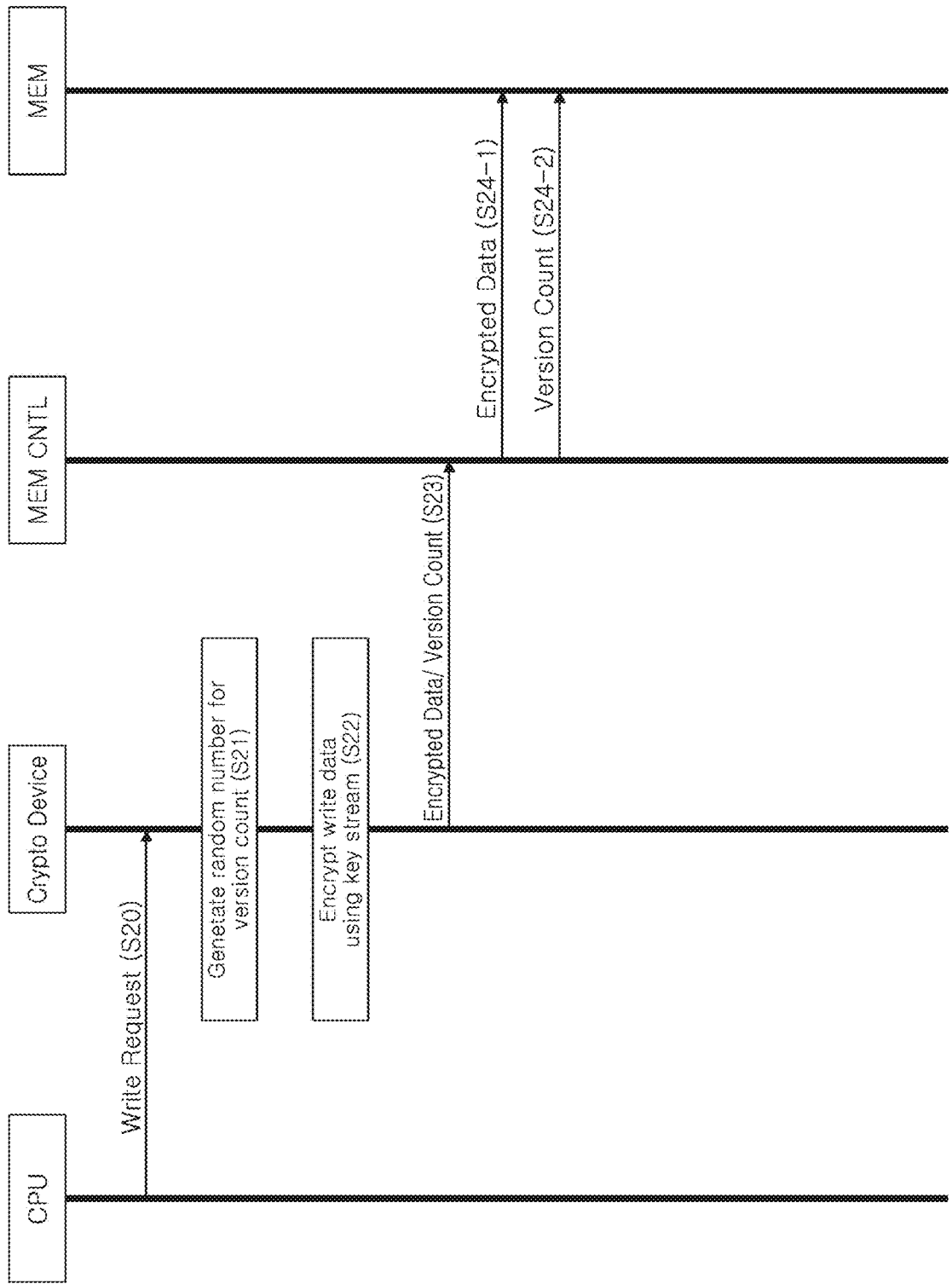
FIG. 10 is a diagram illustrating a ladder diagram of a write operation of the computing system 10 according to some example embodiments.

FIG. 10 is a diagram illustrating a ladder diagram of a write operation of the computing system 10 according to some example embodiments of the present inventive concept. Referring to FIGS. 1 to 10, the write operation of the computing system 10 may be performed as follows.

The central processing unit CPU may transmit a write request to the crypto device 120 (S20). For example, the write request may include information indicating the full write operation. The crypto device 120 may receive a write request, analyze the attribute of the write operation, and request the random number generator 129 to generate a random number when instructing the full write operation as a result of the analysis (S21). The random number generator 129 may generate a random number for a version count VCNT for an encryption operation. In some example embodiments, the generated random number may be the version count VCNT. In other embodiments, the version count VCNT may be generated using the generated random number.

The crypto device 120 may generate a key stream using the version count VCNT and encrypt the write data by logically calculating the write data using the generated key stream (S22). The crypto device 120 may transmit the encrypted data EWD and the corresponding version count VCNT to the memory controller MEM CNTL (S23). The memory controller MEM CNTL may transmit a first write request to the memory device MEM to write the encrypted data EWD in the memory area 212 corresponding to the first address ADD1 (S24-1). Also, the memory controller MEM CNTL may transmit a second write request to the memory device MEM to write metadata having a version count VCNT in the memory area 211 corresponding to the second address ADD2 (S24-2).

In the write operation of the crypto device 120 illustrated in FIG. 10, a version count VCNT using a random number may be immediately generated without a read request from the memory device MEM in the case of a full write operation, and a key stream may be generated using the generated version count VCNT, and the encrypted data WD and the version count VCNT may be written to the memory device MEM using the generated key stream.

Figure 11:
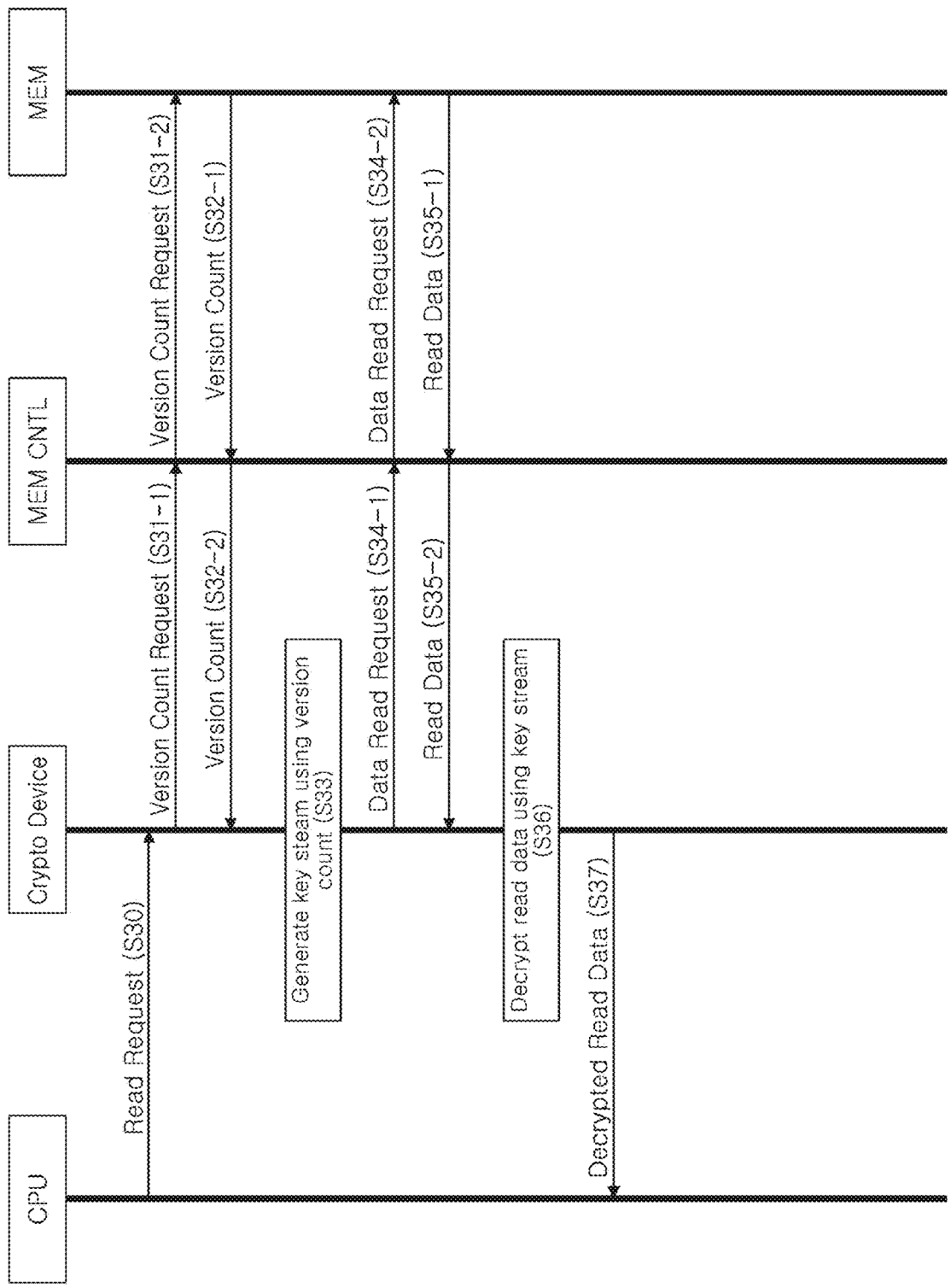
FIG. 11 is a ladder diagram for a read operation of the computing system 10 according to some example embodiments.

FIG. 11 is a diagram illustrating a ladder diagram for a read operation of the computing system 10 according to some example embodiments. Referring to FIGS. 1 to 11, a read operation of the computing system 10 may be performed as follows.

The central processing unit CPU may transmit a read request to the crypto device 120 (S30). For example, the read request may include an address ADD for an area in which read data is stored.

The crypto device 120 may request a version count VCNT from the memory controller MEM CNTL (S31-1). The memory controller MEM CNTL may request the version count VCNT from the memory device MEM using the second address ADD2 corresponding to the address ADD (S31-2). For example, the second address ADD2 corresponds to the address ADD and may be generated from the address generator 128 of the crypto device 120.

The memory device MEM may read the version count VCNT by accessing the memory area 211 corresponding to the second address ADD2 and output the read version count VCNT to the memory controller MEM CNTL (S32-1). The memory controller MEM CNTL may transmit the version count VCNT to the crypto device 120 (S32-2).

The crypto device 120 may receive the version count VCNT, and may generate a key stream using an encryption algorithm (S33). Thereafter, the crypto device 120 transmits a read request for the encrypted data ERD to the memory controller MEM CNTL (S34-1), and the memory controller MEM CNTL may transmit a read request for the encrypted data ERD to the memory device MEM, to access the memory area 212 using the first address ADD1 corresponding to the address ADD (S34-2).

The memory device MEM may read the encrypted data ERD by accessing the memory area 212 corresponding to the first address ADD1 and output the read encrypted data ERD to the memory controller MEM CNTL (S35-1). The memory controller MEM CNTL may transmit the encrypted data ERD to the crypto device 120 (S35-2).

The crypto device 120 may decrypt the encrypted data ERD using the stream key (S36). The crypto device 120 may transmit decrypted data RD to the central processing unit CPU (S37).

The crypto device according to some example embodiments may perform an error correction code (ECC) encoding/decoding operation to improve the reliability of data.

Figure 12:
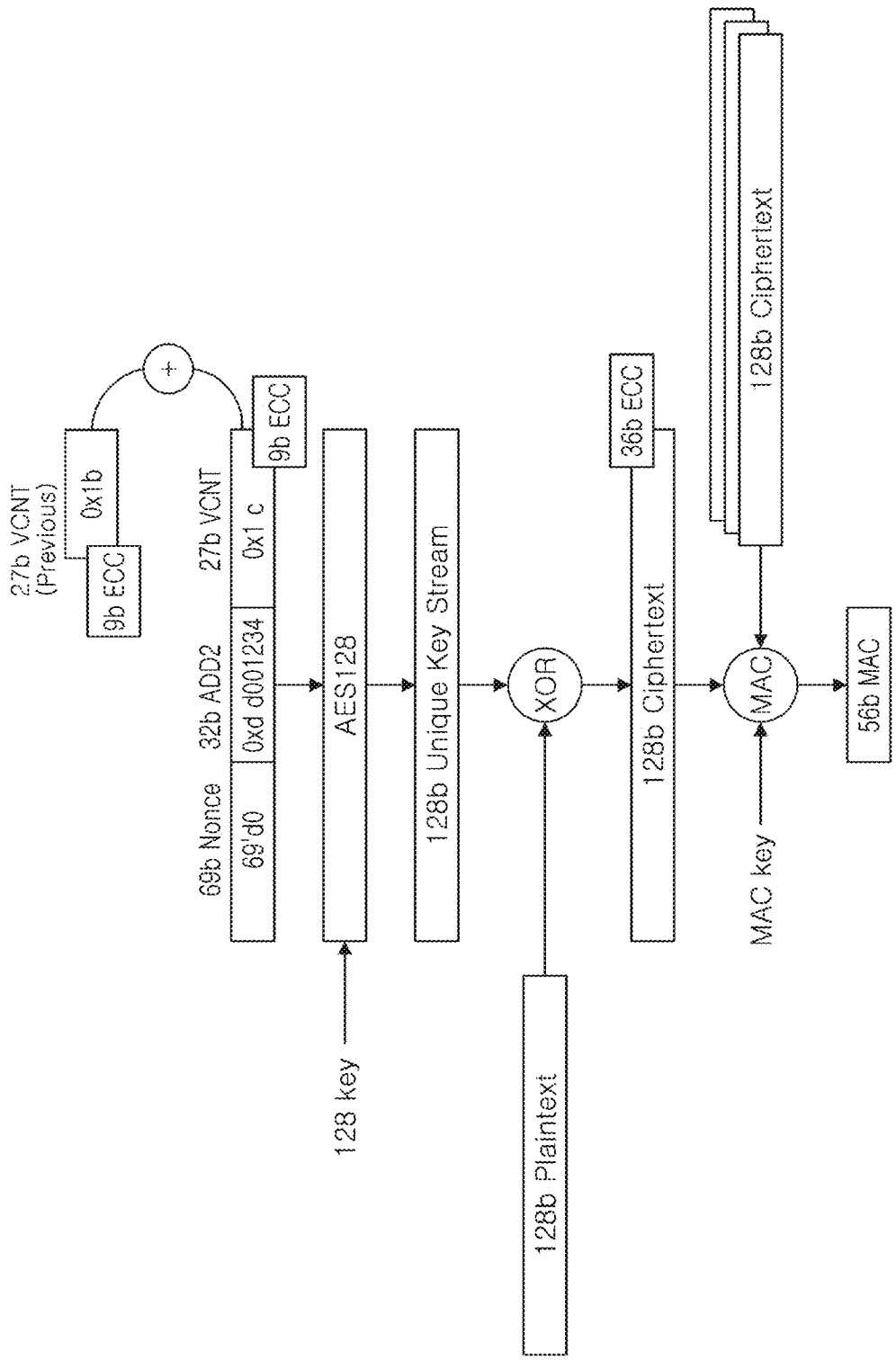
FIG. 12 is a diagram illustrating an encryption process of the crypto device 120 of the computing system 10 according to some example embodiments.

FIG. 12 is a diagram illustrating an example of an encryption process of the crypto device 120 of the computing system 10 according to some example embodiments. Referring to FIG. 12, when data is encrypted and stored in the memory device 200, it is necessary (or desired) to read a previous version count stored in the memory device 200 as illustrated in FIG. 3. A read operation for metadata for stored encrypted data and ECC data may be performed.

In addition, a 128-bit key stream used for an encryption operation (e.g., an encryption operation using an AES algorithm) for data may be generated using a 69-bit nonce, a 32-bit address (e.g., the second address ADD 2), and a 27-bit version count VCNT. Encryption data (Ciphertext) may be generated through a logical operation (e.g., an XOR operation) using 128-bit original data (Plaintext) and a 128-bit key stream.

In addition, together with 9 bits of ECC data for 27 bits of version count VCNT, 36 bits of ECC data for 128 bits of encrypted data (Ciphertext) may be generated.

In addition, a 56-bit Message Authentication Code (MAC) may be generated by an operation using 128-bit ciphertext and a MAC key.

The encryption operation and the ECC encoding operation of the crypto device may proceed as follows. For example, the encryption operation of first to fourth data will be described. Metadata and ECC data may be read from the memory device 200. Metadata may be extracted through an ECC decoding operation. The metadata may include version count VCNT and ECC data. Thereafter, a key stream generation operation may be performed using the version count. Also, an encryption operation using a key stream may be performed. An ECC encoding operation is performed on the first encrypted data, and the first encrypted data may be stored in the memory device 200. Similarly, an ECC encoding operation for the second encrypted data may be performed, and the second encrypted data may be stored in the memory device 200. Similarly, an ECC encoding operation for the third encrypted data may be performed and the third encrypted data may be stored in the memory device 200. Similarly, the ECC encoding operation for the fourth encrypted data may be performed, and the fourth encrypted data may be stored in the memory device 200.

In some example embodiments, a MAC may be generated through a MAC operation using encrypted data. An ECC encoding operation may be performed on metadata including a version count and MAC. The generated metadata and ECC data may be stored in the memory device 200.

Figure 13:
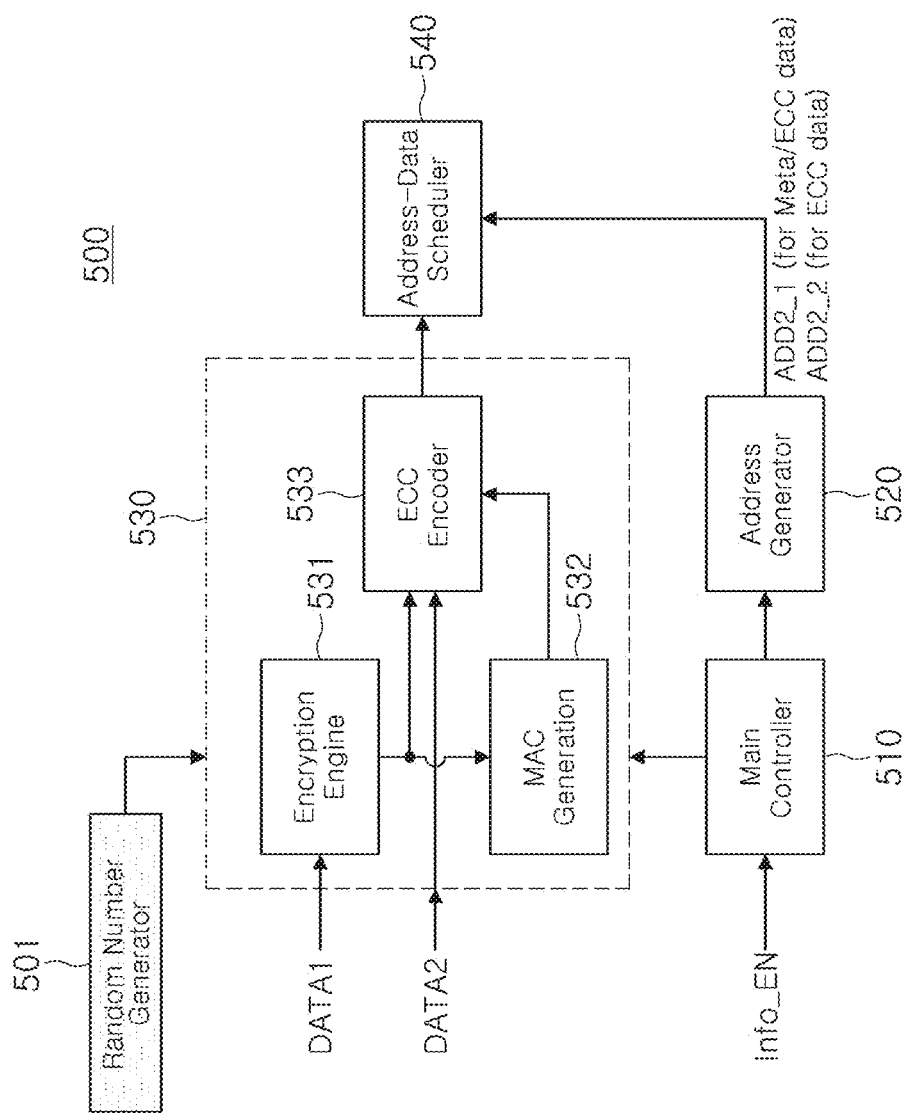
FIG. 13 is a diagram illustrating a crypto device 500 according to some example embodiments.

FIG. 13 is a diagram illustrating a crypto device 500 according to some example embodiments. Referring to FIG. 13, the crypto device 500 may include a random number generator 501, a main controller 510, an address generator 520, an encryption and ECC encoding module 530, and an address-data scheduler 540.

The random number generator 501 may be implemented to generate a random number for the version count VCNT when the RMW operation is not performed as described in FIGS. 1 to 12.

The main controller 510 may control overall operations of the crypto device 500. The encryption and ECC encoding module 530 may include an encryption engine 531, a MAC generator 532 and an ECC encoder 533. When data is stored in the memory device 200 (refer to FIG. 1), whether or not the data is encrypted may be determined by the crypto device 500 or a system-on-chip (SoC) including the crypto device 500. For example, when the system-on-chip (SoC) determines whether to encrypt data, information Info_EN indicating whether to encrypt data in a write operation may be provided to the main controller 510. The main controller 510 may control the operation of the encryption and ECC encoding module 530 based on the information Info_EN.

In some example embodiments, when the encryption operation is performed on the first data DATA1 and the encryption operation is not performed on the second data DATA2, the encryption engine 531 may encrypt the first data DATA1, provide the encrypted data to the MAC generator 532, and also provide encrypted data and metadata (e.g., version count VCNT) to the ECC encoder 533. Further, the MAC from the MAC generator 532 may be provided to the ECC encoder 533, as metadata. The ECC encoder 533 may generate first ECC data for encrypted data and second ECC data for metadata. In some example embodiments, the ECC encoder 533 may generate ECC data for the second data DATA2 without performing an encryption operation on the second data DATA2.

The main controller 510 may control the operation of the address generator 520 based on the information Info_EN. The address generator 520 may calculate a second address using an address related to storage of the first and second data DATA1 and DATA2. Also, the address generator 520 may calculate a second address ADD2_1 for storing metadata and ECC data in relation to the first data DATA1. Also, the address generator 520 may calculate a second address ADD2_2 for storing ECC data related to the second data DATA2. Data and addresses generated as described above may be provided to the address-data scheduler 540.

When the second address ADD2_1 related to the first data DATA1 is generated, the address generator 520 may perform an address generation operation to have information for storing more data. In some example embodiments, when generating the second address ADD2_2 related to the second data DATA2, the address generator 520 may perform an address generation operation to have information for storing relatively small data. Accordingly, when the encryption operation is not performed, ECC data related to more data may be stored in the same row or column of the memory.

The address-data scheduler 540 may control an order of outputting addresses or data. When the encryption operation is not performed, the address-data scheduler 540 outputs a relatively large number of data and addresses corresponding thereto, and then, may perform scheduling such that ECC data related to the plurality of data may be collectively provided to the memory.

Figure 14:
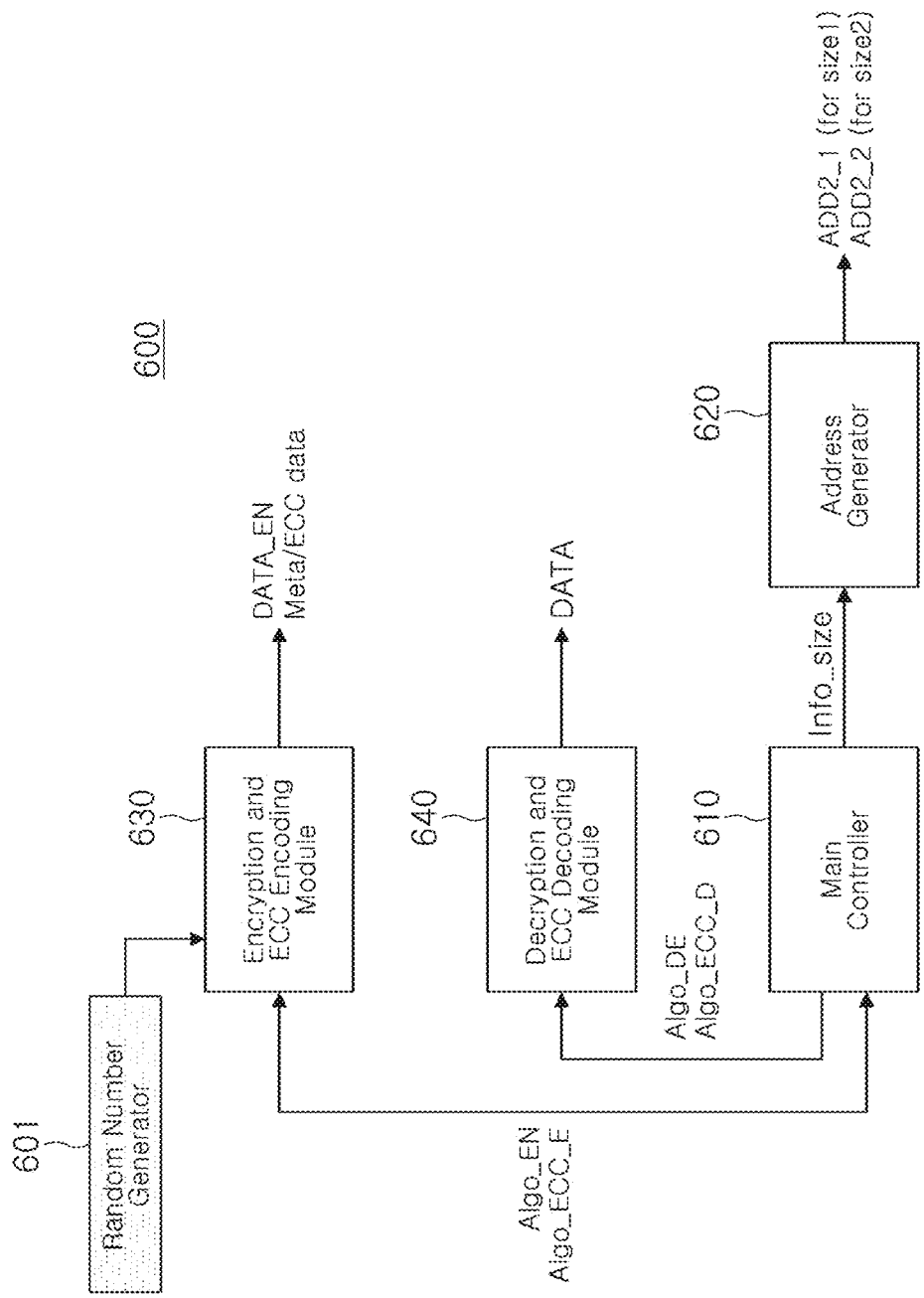
FIG. 14 is a diagram schematically illustrating a crypto device 600 according to some example embodiments.

FIG. 14 is a diagram schematically illustrating a crypto device 600 according to some example embodiments. Referring to FIG. 14, the crypto device 600 may include a random number generator 601, a main controller 610, an address generator 620, an encryption and ECC encoding module 630, and a decryption and ECC decoding module 640.

The random number generator 601 may be implemented to generate a random number for the version count VCNT when the RMW operation is not performed, as described in FIGS. 1 to 12.

The main controller 610 may control overall operations of the crypto device 600.

In some example embodiments, an algorithm used for an encryption/decryption operation and an algorithm used for an ECC operation may be selected based on the control of the crypto device 600 or a system-on-chip including the crypto device 600. In some example embodiments, the size of metadata may vary depending on an algorithm used for an encryption/decryption operation and an algorithm used for an ECC operation. In some example embodiments, the size of ECC data may vary.

As the type of the algorithm is selected based on the control of the main controller 610, the main controller 610 may provide encryption algorithm information Algo_EN and ECC encoding algorithm information Algo_ECC_E to the encryption and ECC encoding module 630. In addition, the main controller 610 may provide decrypting algorithm information Algo_DE and ECC decoding algorithm information Algo_ECC_D to the decryption and ECC decoding module 640. In addition, the main controller 610 may provide information Info_size related to the size of additional data generated in the encryption operation and the ECC operation according to the selected algorithm, to the address generator 620.

The address generator 620 may further refer to the information Info_size when generating the second address. For example, when additional data having a relatively large first size is generated for the first data and additional data having a relatively small second size is generated for the second data, the address generator 620 may generate second addresses ADD2_1 and ADD2_2 for generating additional data of different magnitudes, respectively. For example, when the magnitude of the additional data is small, metadata and ECC data may be stored in a relatively small number of rows or columns.

In addition, additional data (metadata and ECC data) related to more data may be stored in the same row or column of the memory. In addition, in some example embodiments, the scheduling operation of the address-data scheduler may vary based on the magnitude of the additional data.

The computing device according to some example embodiments may include a plurality of memory channels.

Figure 15:
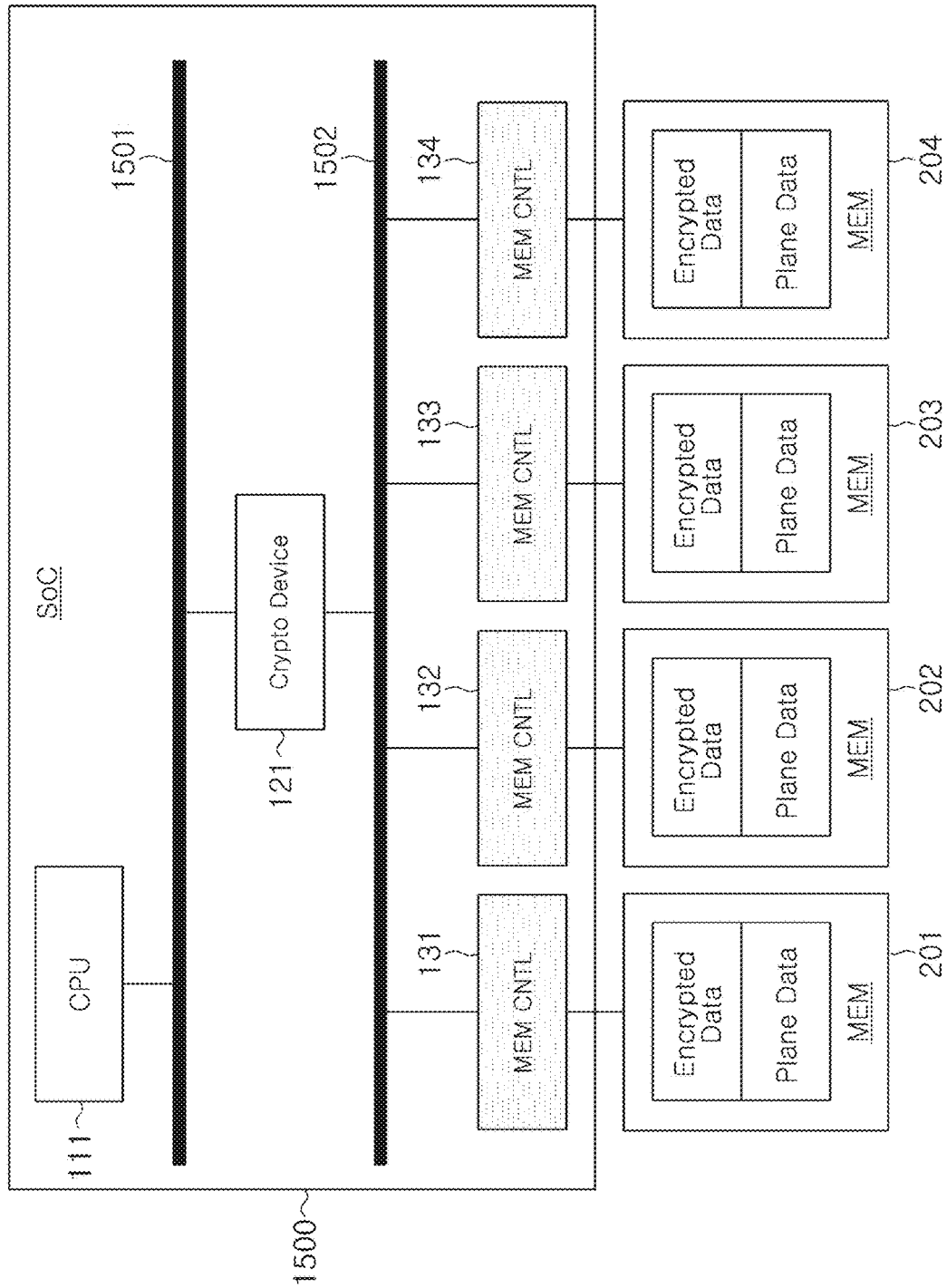
FIG. 15 is a diagram illustrating a computing device 20 according to some example embodiments.

FIG. 15 is a diagram illustrating a computing device 20 according to some example embodiments. Referring to FIG. 15, the computing device 20 may include an SoC 1500 connected to memory devices 201, 202, etc., through a plurality of memory channels 131, 132, etc., (e.g., four channels), compared with the computing device 10 illustrated in FIG. 1.

In FIG. 15, similar to FIG. 1, the crypto device 121 is connected to a corresponding memory controller 131, 132, etc. (also, MEM CNTL) through a bus 1502, and is further connected to a CPU 111 though a bus 1501. However, the present inventive concepts need not be limited thereto. The crypto device 121 in some example embodiments of the present inventive concepts may be disposed between the bus and the memory controller.

Figure 16:
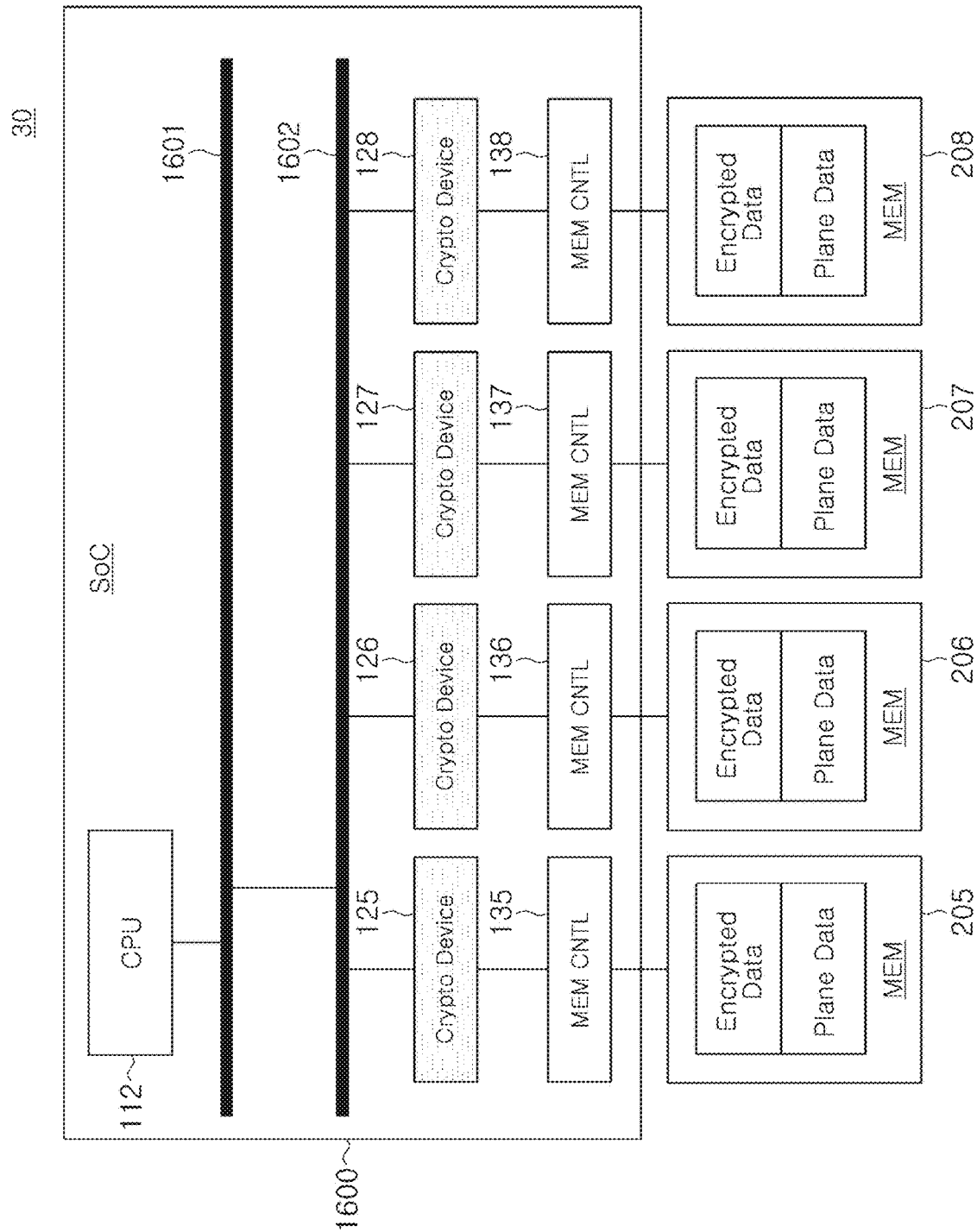
FIG. 16 is a diagram illustrating a computing device 30 according to some example embodiments.

FIG. 16 is a diagram illustrating a computing device 30 according to some example embodiments. Referring to FIG. 16, the computing device 30 may include a SoC 1700 including a CPU 112, and crypto devices 125, 126, 127, 128, etc., disposed between buses 1601 and 1602 and memory controllers 135, 136, etc. (also, MEM CNTL), the SoC 1700 connected to memory devices 205, 206, 207, 208, etc. by the memory controllers 135, 136, etc. compared to that illustrated in FIG. 15.

In FIG. 16, similar to FIG. 1, two buses 1601 and 1602 are illustrated inside the SoC. However, the number of buses of the present inventive concepts are not limited thereto. The SoC according to some example embodiments may be implemented with one bus.

Figure 17:
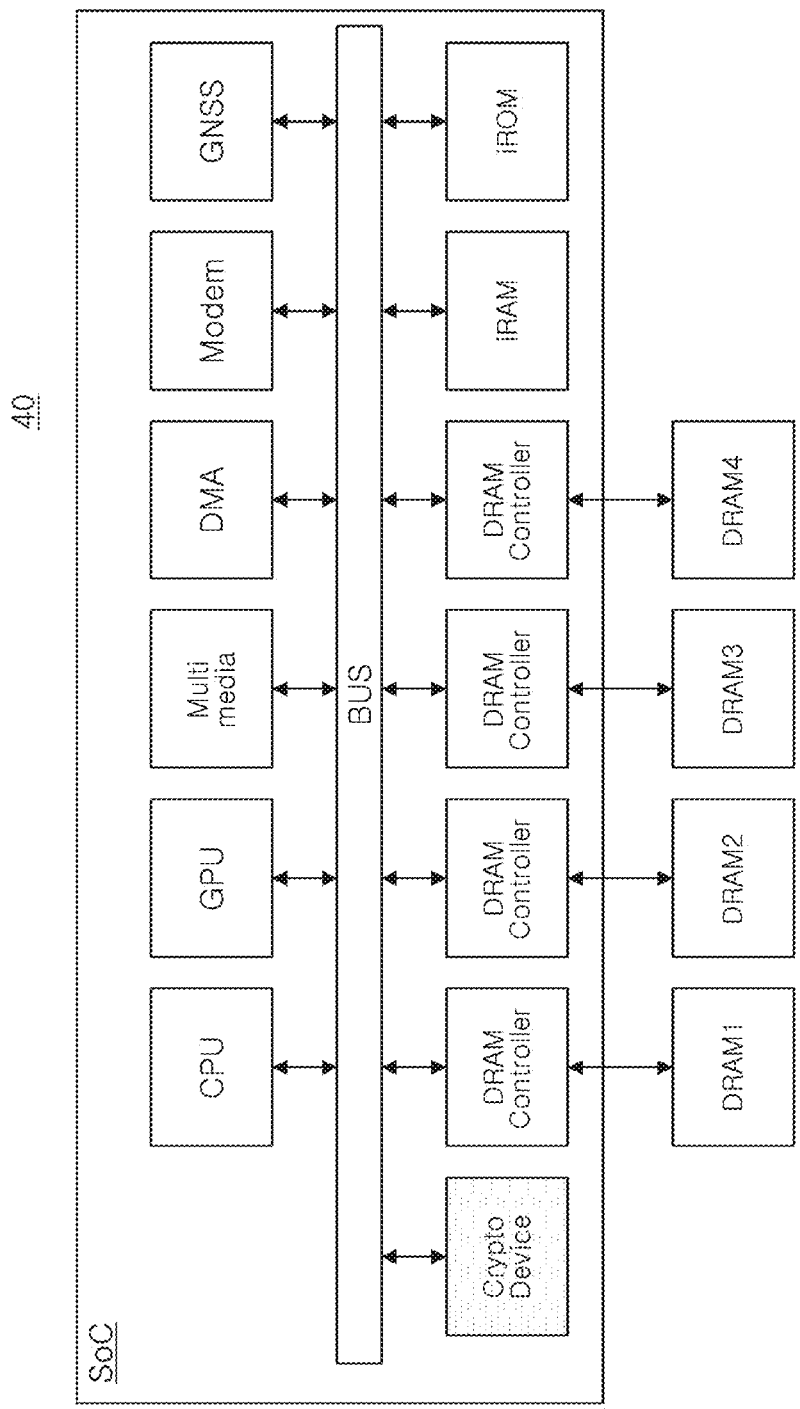
FIG. 17 is a diagram illustrating a computing device 40 according to some example embodiments.

FIG. 17 is a diagram illustrating a computing device 40 according to some example embodiments. Referring to FIG. 17, the computing device 40 may include a plurality of Intellectual Properties IPs and a crypto device connected to one bus. The crypto device may provide an encryption operation or a decryption operation in an on-the-fly method. As described in FIGS. 1 to 14, the crypto device may improve the performance of the encryption operation by generating version counts in different manners according to the attributes of the write operation.

FIG. 17 illustrates a structure in which one crypto device is connected to one bus. The structure of the present inventive concepts are not limited thereto. The crypto device corresponding to the respective memory channels may be connected to one bus.

Figure 18:
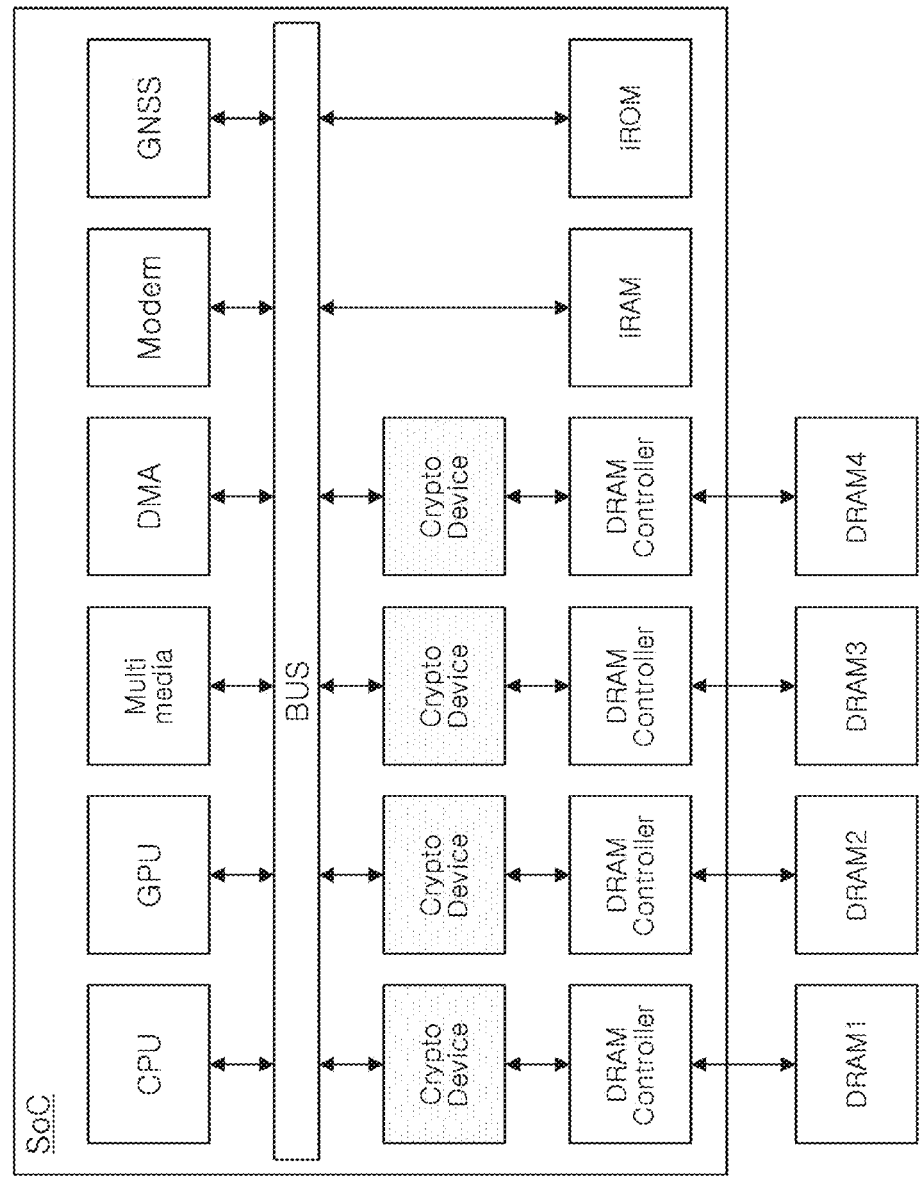
FIG. 18 is a diagram illustrating a computing device 50 according to some example embodiments.

FIG. 18 is a diagram illustrating a computing device 50 according to some example embodiments. Referring to FIG. 18, the computing device 50 has crypto devices that are disposed between the bus and the DRAM controllers, compared to that illustrated in FIG. 17.

A computing system according to some example embodiments of the present inventive concepts may further include Intellectual Properties (IPs) performing various functions.

Figure 19:
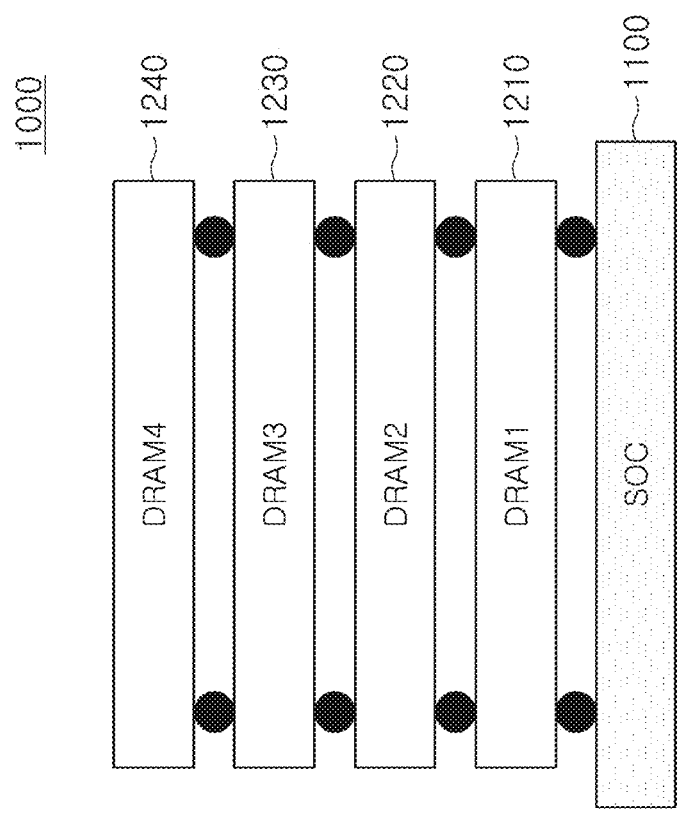
FIG. 19 is a diagram illustrating a computing system 1000 according to some example embodiments.

FIG. 19 is a diagram illustrating a computing system 1000 according to some example embodiments. Referring to FIG. 19, the computing system 1000 may include a system-on-chip SOC 1100 and a plurality of DRAMs 1210, 1220, 1230, 1240, etc.

The SoC may include a CPU, a crypto device, DRAM hardware, DRAM controllers, an internal SRAM (iRAM), an internal ROM (iROM), a Graphics Processing Unit (GPU), a multimedia chip, a Direct Memory Access (DMA) chip, a modem, and/or a Global Navigation Satellite System (GNSS) chip.

The internal RAM may be implemented to temporarily store data necessary for the operation of the CPU. For example, the internal RAM may be implemented with Synchronous Random Access Memory (SRAM). The internal ROM may be implemented to store operating system/program-related code (instruction) of the CPU. For example, the internal ROM may be implemented as a non-volatile memory. The GPU may be a chip for processing exclusively for graphics. The multimedia chip may be a chip for exclusively processing multimedia data. The DMA chip may be implemented to directly access DRAMs without going through the CPU. The modem may be implemented to perform wired or wireless communication with the outside. The GNSS chip may be implemented to receive satellite navigation data and determine the location of the computing system.

It should be understood that in the SOC according to some example embodiments, at least one of the IPs illustrated in FIG. 19 may be omitted or at least one IP not illustrated in FIG. 19 may be added. It also should be understood that in the SOC according to some example embodiments of the present inventive concept, at least two of the IPs illustrated in FIG. 19 may be implemented in one chip.

Figure 20:
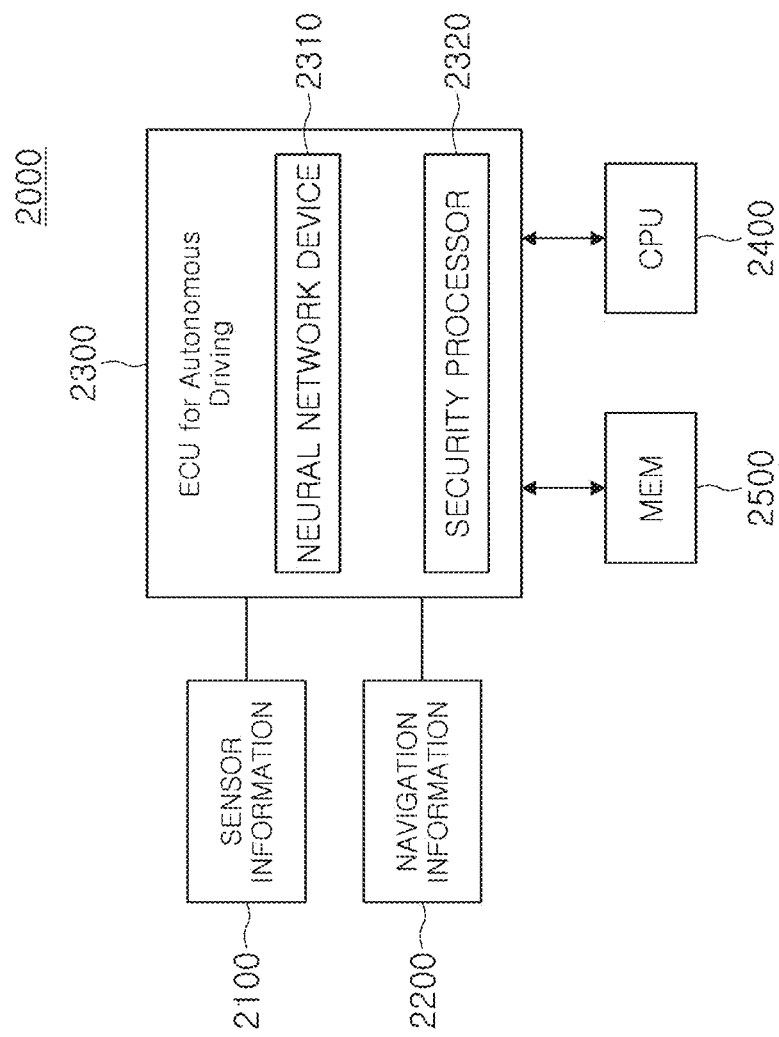
FIG. 20 is a block diagram schematically illustrating a vehicle control system 2000 according to some example embodiments.

FIG. 20 is a block diagram schematically illustrating a vehicle control system 2000 according to some example embodiments. Referring to FIG. 20, the vehicle control system 2000 for autonomous driving may include a sensor information collecting device 2100, a navigation information collecting device 2200, an electronic control unit (ECU) 2300 for autonomous driving, and a central processing unit 2400 and a memory device 2500. In addition, the electronic control unit 2300 for autonomous driving may include a neural network device 2310 and a crypto device 2320. The crypto device 2320 may be implemented with the crypto device described in FIGS. 1 to 14.

The neural network device 2310 may perform a neural network operation using various image information and voice information, and may generate information signals such as an image recognition result and a voice recognition result based on the execution result.

The sensor information collecting device 2100 may include devices capable of collecting various image information and audio information, such as a camera or a microphone, and may provide the same to the electronic control unit 2300 for autonomous driving.

The navigation information collection device 2200 may provide various types of information (e.g., location information, etc.) related to vehicle operation to the electronic control unit 2300 for autonomous driving. The neural network device 2310 may generate an information signal by receiving information from the sensor information collecting device 2100 or the navigation information collecting device 2200 and thus executing various types of neural network models.

When the sensor information collecting device 2100 includes a camera or a microphone, the crypto device 2320 of the autonomous driving module 2300 may perform a decryption operation and an ECC operation, as security processing for voice data or image data from the sensor information collecting device 2100. As described above, the crypto device 2320 may store encrypted data and metadata/ECC data in the memory device 2500.

In FIG. 20, an example in which some example embodiments of the present inventive concepts are applied to an autonomous driving system is described, but example embodiments of the present inventive concepts may be applied to products requiring a security function for a camera sensor, such as IoT, a surveillance camera, and/or the like.

In general, incrementing the version count value is to generate a different key stream for each write in terms of confidentiality, and is to record the time at which write is performed in terms of countermeasures against replay attacks. However, in an environment where countermeasures against replay attacks do not need to be considered, the version count does not necessarily have to be a value that increases monotonically, and there is no security problem if the value changes at every write. Therefore, in a system that considers only confidentiality, it is not necessary to read the version count from the memory when writing, and one random number is generated through a random number generator interlocked with an encryption device, and then a key stream is generated using the same, thereby obtaining the same effect as that of the version counter.

In some example embodiments, in the case of partial write in which write of cache line CL size or less is performed, there is a requirement to write after re-encrypting, the data to be kept without being written, through a new key stream. For this reason, since RMW using the existing version count value has to be performed, the above-described method cannot be applied as it is. Therefore, it is necessary to determine whether the above-described writing method may be applied at each write operation or the RMW is to be applied, and a determination technique and a device that selectively use the write method are required. For example, in the case of AXI AMBA Protocol, which is a standard for ARM products, determination through the configuration of the Write Strobe signal WSTRB in the write data channel during write transaction is required.

The techniques and apparatuses in the present inventive concepts may selectively generate a read operation for the version count value depending on whether or not an RMW operation is required in an environment where a different encryption result is required each time a write operation is performed, due to the importance of data confidence. As a result, only when all data is written in a 64B or CL unit write operation of an arbitrary size, performance may be improved while securing the same level of security by only a write operation without a read operation for securing the version count.

As set forth above, in a crypto device, an integrated circuit and a computing device having the same, and a writing method thereof according to some example embodiments, a write attribute may be determined, and version counts may be generated in different manners depending on the write attribute, thereby significantly reducing access to a memory device. Thereby, the crypto device according to some example embodiments, a system-on-chip having the same, and a writing method thereof may exhibit optimal or improved performance while supporting a partial write operation.

While example embodiments have been illustrated and described above, it will be apparent to those skilled in the art that modifications and variations could be made without departing from the scope of the present inventive concepts as defined by the appended claims.

What is claimed is:

1. A writing method of a crypto device, comprising:
 receiving a write request from a central processing unit;
 determining a write attribute of the write request; and
 performing one of a partial write operation and a full write operation, according to the write attribute,
 the full write operation including
  generating a version count based on a random number,
  generating a key stream based on the version count,
  encrypting write data by performing a first logical operation on the key stream and the write data, and
  storing the encrypted data and the version count in a memory device.

2. The writing method of claim 1, wherein the write request includes the write data, a first address, and at least one control signal.

3. The writing method of claim 2, wherein
 the at least one control signal includes a write strobe signal indicating a byte of valid write data, and
 the determining the write attribute includes determining the write attribute by analyzing the write strobe signal.

4. The writing method of claim 2, further comprising generating a second address for storing the version count in the memory device.

5. The writing method of claim 1, wherein the encrypted data is stored in an encrypted data area of the memory device, and
 the version count is stored in a plain data area of the memory device.

6. The writing method of claim 1, wherein the partial write operation includes
   reading a previous version count and previous data from the memory device,
   generating a previous key stream using the previous version count,
   decrypting the previous data by performing a second logical operation on the previous key stream and the previous data,
   generating a new version count by counting up the previous version count,
   generating a new key stream using the new version count,
   modulating the decrypted data using the write data,
   encrypting the modulated data by performing the first logical operation on the new key stream and the modulated data, and
   storing the encrypted data and the new version count in the memory device.

7. The writing method of claim 1, wherein the first logical operation includes an XOR operation, and the key stream is generated based on an Advanced Encryption Standard (AES) algorithm.

8. The writing method of claim 1, further comprising requesting the memory device to read data and metadata having a version count in the partial write operation.

9. The writing method of claim 8, further comprising receiving the metadata corresponding to the requesting for reading and a plurality of consecutive data.

10. The writing method of claim 8, wherein the requesting for reading further includes requesting merge transmission for the metadata.

11. An integrated circuit comprising:
    a central processing unit configured to control an operation of the integrated circuit;
    a crypto device circuit configured to
       receive a write request from the central processing unit and encrypt write data, or
       receive a read request from the central processing unit and decrypt read data received from a memory device; and
    a memory controller configured to
       write the encrypted data to the memory device or
       read the read data from the memory device according to a request from the crypto device,
    the crypto device circuit being configured to
       receive the write request from the central processing unit,
       determine a write attribute of the write request, and
       perform one of a partial write operation and a full write operation according to the write attribute, the full write operation includes generating a version count based on a random number, generating a key stream based on the version count, encrypting write data by performing a logical operation on the key stream and the write data, and storing the encrypted data and the version count in the memory device.

12. The integrated circuit of claim 11, the crypto device circuit further including a write attribute analyzer circuit configured to
    receive the write request, output a first address and a first control signal for data, and
    generate a read-modify-write (RMW) activation signal by determining the write attribute.

13. The integrated circuit of claim 12, the crypto device circuit further including a random number generator circuit configured to generate the random number based on the RMW activation signal indicating an inactive state.

14. The integrated circuit of claim 12, the crypto device circuit further including an address generator circuit configured to
    receive the first address and the first control signal and generate a second address and a second control signal for the version count.

15. The integrated circuit of claim 14, the crypto device circuit further including an address-data scheduler circuit configured to
    receive the first address and the first control signal from the write attribute analyzer circuit,
    receive the second address and the second control signal from the address generator circuit,
    generate a read request from the memory controller to read previous data from a first memory area corresponding to the first address, and
    read a previous version count from a second memory area corresponding to the second address, from the memory device, based on the RMW activation signal indicating an activation state.

16. A computing device comprising:
    a system-on-chip (SoC); and
    at least one memory device having a first area and a second area,
    wherein the SoC includes,
    at least one central processing unit;
    a crypto device circuit configured to
       encrypt write data in response to a write request from the at least one central processing unit, and
       generate a version count corresponding to the write request; and
    a memory controller configured to control the at least one memory device to store the version count in the first area and store the encrypted data in the second area, and the version count being generated by based on a random number during a full write operation.

17. The computing device of claim 16, wherein the crypto device includes
    a write attribute analyzer circuit configured to receive the write request,
       output a first address and a first control signal for the write data, and
       output a read-modify-write (RMW) activation signal by analyzing a write attribute of the write request;
    an address generator circuit configured to
       receive the first address and the first control signal, and
       output a second address and a second control signal for the version count;
    an address-data scheduler circuit configured to
       receive the first address and the first control signal from the write attribute analyzer circuit,
       receive the second address and the second control signal from the address generator circuit, and
       output a read request or a write request corresponding to a partial write operation or a full write operation according to an RMW activation signal, to the memory controller;
    a random number generator circuit configured to generate the random number based on the RMW activation signal indicates an inactive state;
    an encryption module configured to receive the write data from the write attribute analyzer,
       generate a key stream corresponding to the version count, encrypt the write data by performing a first logical operation on the key stream and the write data, and output the encrypted data and the version count to the address-data scheduler circuit;

a decryption module configured to receive encrypted read data and a previous version count from the address-data scheduler circuit, generate a previous key stream corresponding to the previous version count, and decrypt the encrypted read data by performing a second logical operation on the previous key stream and the encrypted read data; and a main controller configured to control the write attribute analyzer circuit, the address generator circuit, the address-data scheduler circuit, and the random number generator circuit.

18. The computing device of claim 17, wherein the encryption module includes an encryption engine circuit configured to receive the write data from the write attribute analyzer, receive the version count from the main controller or the random number generator circuit, encrypt the write data based on an encryption algorithm, and generate the encrypted data; and a write data handler circuit configured to receive the encrypted data from the encryption engine, receive the version count from the main controller or the random number generator circuit, and output the encrypted data and the version count to the address-data scheduler circuit.

19. The computing device of claim 17, wherein the decryption module includes:

a decryption engine circuit configured to receive the encrypted read data and the previous version count, and decrypt the encrypted read data based on an encryption algorithm; and a read data handler circuit configured to receive the encrypted read data and the previous version count from the address-data scheduler circuit, output the encrypted read data and the previous version count to the decryption engine circuit, and output the previous version count to the memory controller.

20. The computing device of claim 17, wherein the address-data scheduler circuit is configured to merge and transmit metadata.

* * * * *